US011710199B1

(12) United States Patent
Cali et al.

(10) Patent No.: US 11,710,199 B1
(45) Date of Patent: Jul. 25, 2023

(54) ENVIRONMENTAL IMPACT ATTRIBUTION FOR ENERGY PRODUCTION AND FULFILLMENT USING DISTRIBUTED LEDGERS

(71) Applicant: EnergyXchain, LLC, Charlotte, NC (US)

(72) Inventors: Umit Cali, Kassel Hesse (DE); David A. Doctor, Huntersville, NC (US); Robert W. Norris, Charlotte, NC (US)

(73) Assignee: ENERGYXCHAIN, LLC, Charlotte, NC (US)

( * ) Notice: Subject to any disclaimer, the term of this patent is extended or adjusted under 35 U.S.C. 154(b) by 0 days.

(21) Appl. No.: 17/826,842

(22) Filed: May 27, 2022

Related U.S. Application Data

(60) Provisional application No. 63/314,569, filed on Feb. 28, 2022.

(51) Int. Cl.
*G06Q 50/06* (2012.01)
*G06Q 40/04* (2012.01)

(52) U.S. Cl.
CPC ............. *G06Q 50/06* (2013.01); *G06Q 40/04* (2013.01)

(58) Field of Classification Search
CPC ................................ G06Q 50/06; G06Q 40/04
See application file for complete search history.

(56) References Cited

U.S. PATENT DOCUMENTS

| | | | | |
|---|---|---|---|---|
| 8,082,486 B1 * | 12/2011 | Damman | ............... | G06F 16/907 715/201 |
| 10,983,958 B1 * | 4/2021 | Miller | ..................... | H02J 3/381 |
| 2006/0161450 A1 * | 7/2006 | Carey | .................... | G06Q 10/06 705/412 |
| 2010/0235209 A1 * | 9/2010 | Vaswani | ................ | G06Q 30/04 705/308 |
| 2011/0320368 A1 * | 12/2011 | Corrigan | ................ | G06Q 10/30 705/308 |

(Continued)

FOREIGN PATENT DOCUMENTS

| | | | | |
|---|---|---|---|---|
| EP | 3637347 A1 * | 4/2020 | ......... | G06F 16/2379 |
| WO | WO-2020067068 A1 * | 4/2020 | ............. | B60K 35/00 |
| WO | WO-2021156835 A1 * | 8/2021 | ............. | G06Q 10/06 |

OTHER PUBLICATIONS

Dorning et al.: Review of indicators for comparing environmental effects across energy sources, 2019, Environmental Research Letters, pp. 1-16. (Year: 2019).*

(Continued)

*Primary Examiner* — Bijendra K Shrestha
(74) *Attorney, Agent, or Firm* — Norton Rose Fulbright US LLP

(57) ABSTRACT

Methods and systems for improved environmental impact and attribution using distributed ledgers are provided. In one embodiment, a method is provided that includes retrieving transaction data concerning an energy transaction from a distributed database. A delivery process and/or a production process for the energy transaction may be identified based on the transaction data. Environmental impact measures may be determined for the production process, the delivery process, and/or consuming an energy resource. One or more attributions may be created for the environmental impact measures and may be stored on within the distributed database.

20 Claims, 7 Drawing Sheets

(56) References Cited

U.S. PATENT DOCUMENTS

| | | | | |
|---|---|---|---|---|
| 2018/0299852 A1* | 10/2018 | Orsini | .................. | G05B 19/042 |
| 2021/0014065 A1* | 1/2021 | Gourisetti | ............. | H04L 9/3236 |
| 2021/0217110 A1* | 7/2021 | Anglin | .............. | H02J 13/00007 |

OTHER PUBLICATIONS

Zhang et al.: Big data analytics in smart grids: a review, 2018, Energy Informatics, pp. 1-24 (Year: 2018).*

Burns et al.:Attribution of production-stage methane emissions to assess spatial variability in the climate intensity of US natural gas consumption, 2021, Environmental Research Letters, pp. 1-10. (Year: 2021).*

Vujicic et al.: Distributed Ledger Technology as a Tool for Environmental Sustainability in the Shipping Industry, 2000, Journal of Marine Science and Engineering, pp. 1-14. (Year: 2000).*

EPA.gov: Electrcity Delivery and its Environmental Impacts, Nov. 12, 2021, Energy and the Enrollment, pp. 1-8 (Year: 2021).*

* cited by examiner

ENVIRONMENTAL IMPACT ATTRIBUTION FOR ENERGY PRODUCTION AND FULFILLMENT USING DISTRIBUTED LEDGERS

GOVERNMENT RIGHTS

This invention was made with government support under Federal Award Identification Number 1951161, awarded by the National Science Foundation. The government has certain rights in the invention.

PRIORITY CLAIM

This application is a non-provisional application of U.S. patent application Ser. No. 63/314,569 filed on Feb. 28, 2022, which is incorporated herein by reference.

BACKGROUND

Millions of energy transactions occur daily on a system within energy production systems. Transaction participants may be energy or energy resource producers, energy or energy resource consumers, transportation or delivery providers, and/or independent third parties paid a fee to manage transactions. These parties (or parties seeking to create new energy transactions) may have a need to determine the environmental impacts of different types of energy resources or energy transactions.

SUMMARY

The present disclosure presents new and innovative systems and methods for environmental impact and attribution using distributed ledgers. In a first aspect, a method is provided that includes retrieving, from a distributed database implemented at least in part by a distributed ledger, transaction data concerning at least a first energy transaction concerning an energy resource. The method may also include identifying, based on the transaction data, at least one production process associated with the first energy transaction and at least one delivery process associated with the first energy transaction and determine a first environmental impact measure for the at least one production process, a second environmental impact measure for the at least one delivery process, and a third environmental impact measure for consuming the energy resource. The method may further include creating an attribution of at least one of the first environmental impact measure, the second environmental impact measure, and the third environmental impact measure to at least one party of the first energy transaction and storing the attribution within the distributed database.

In a second aspect according to the first aspect, the attribution assigns the first environmental impact measure, the second environmental impact measure, and the third environmental impact measure to a purchasing party of the first energy transaction.

In a third aspect according to any of the first and second aspects, the attribution assigns the first environmental impact measure to at least one producing party for the energy resource, assigns the second environmental impact measure to at least one delivering party for the energy resource, and assigns the third environmental impact measure to a purchasing party of the first energy transaction.

In a fourth aspect according to any of the first through third aspects, the first environmental impact measure, the second environmental impact measure, and/or the third environmental impact measure are calculated to approximate emissions produced by the at least one production process, the at least one delivery process, and/or consumption of the energy resource.

In a fifth aspect according to any of the first through fourth aspects, the method further includes generating a correction for the first energy transaction based on the attribution.

In a sixth aspect according to the fifth aspect, generating the correction includes comparing a total environmental impact measure of the first energy transaction to at least one predetermined threshold associated with the first energy transaction, determining that the total environmental impact measure exceeds the predetermined carbon threshold, and generating an updated version of the first transaction to increase the predetermined threshold.

In a seventh aspect according to the sixth aspect, the predetermined threshold is specified in an agreement for the first energy transaction, and wherein the agreement is stored on the distributed ledger.

In an eighth aspect according to the seventh aspect, the correction includes an updated version of the agreement.

In a ninth aspect according to the eighth aspect, the updated version of the agreement includes an adjustment to at least one financial cost of the agreement.

In a tenth aspect according to any of the fifth through ninth aspects, the predetermined threshold is specified by at least one regulatory requirement concerning the energy resource.

In an eleventh aspect according to any of the fifth through tenth aspects, the total environmental impact includes the first environmental impact measure, the second environmental impact measure, and the third environmental impact measure.

In a twelfth aspect according to any of the first through eleventh aspects, the at least one delivery process is identified in a second energy transaction concerning the energy resource.

In a thirteenth aspect according to any of the first through twelfth aspects, the at least one production process is identified in a third energy transaction concerning the energy resource.

In a fourteenth aspect, a system is provided that includes a processor and a memory. The memory may store instructions which, when executed by the processor, cause the processor to retrieve, from a distributed database implemented at least in part by a distributed ledger, transaction data concerning at least a first energy transaction concerning an energy resource. The instructions may also cause the processor to identify, based on the transaction data, at least one production process associated with the first energy transaction and at least one delivery process associated with the first energy transaction and determine a first environmental impact measure for the at least one production process, a second environmental impact measure for the at least one delivery process, and a third environmental impact measure for consuming the energy resource. The instructions may further cause the processor to create an attribution of at least one of the first environmental impact measure, the second environmental impact measure, and the third environmental impact measure to at least one party of the first energy transaction; and store the attribution within the distributed database.

In a fifteenth aspect according to the fourteenth aspect, the attribution assigns the first environmental impact measure, the second environmental impact measure, and the third environmental impact measure to a purchasing party of the first energy transaction.

In a sixteenth aspect according to any of the fourteenth and fifteenth aspects, the attribution assigns the first environmental impact measure to at least one producing party for the energy resource, assigns the second environmental impact measure to at least one delivering party for the energy resource, and assigns the third environmental impact measure to a purchasing party of the first energy transaction.

In a seventeenth aspect according to any of the fourteenth through sixteenth aspects, the first environmental impact measure, the second environmental impact measure, and/or the third environmental impact measure are calculated to approximate emissions produced by the at least one production process, the at least one delivery process, and/or consumption of the energy resource.

In an eighteenth aspect according to any of the fourteenth through seventeenth aspects, the instructions further cause the processor to generate a correction for the first energy transaction based on the attribution.

In a nineteenth aspect according to the eighteenth aspect, the instructions further cause the processor, while generating the correction, to compare a total environmental impact measure of the first energy transaction to at least one predetermined threshold associated with the first energy transaction, determine that the total environmental impact measure exceeds the predetermined carbon threshold, and generate an updated version of the first transaction to increase the predetermined threshold.

In a twentieth aspect according to the nineteenth aspect, the predetermined threshold is specified in an agreement for the first energy transaction, and wherein the agreement is stored on the distributed ledger.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
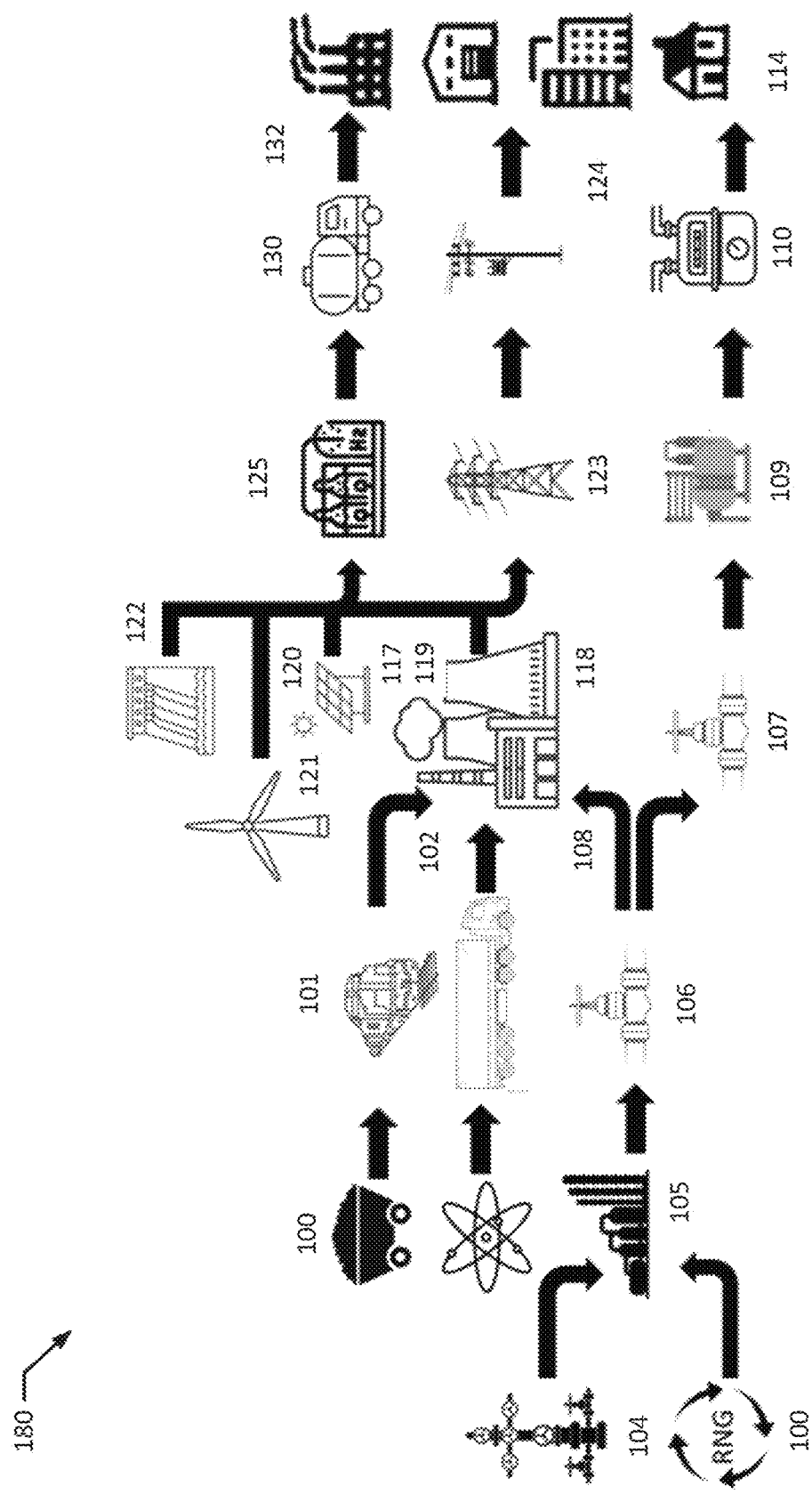
FIG. 1 illustrates a production and fulfillment flow for various energy resources according to an exemplary embodiment of the present disclosure.

Aspects of the present disclosure involve systems and methods for identification of environmental impacts of various energy resources within an energy production and fulfillment grid. For example, environmental impacts may be determined for individual transaction components and/or may be aggregated at specified energy consumption locations (e.g., at "end user" locations). The environmental impact may be computed as an environmental impact measure based on various environmental impacts (e.g., emissions impacts, production impacts) caused by production, transportation, and/or consumption of the energy resource. In certain instances, the environmental impact measure may be computed at least in part based on a result of a system query (e.g., for production and transportation/delivery practices utilized for the energy resource). The environmental impact measure may be compared to other environmental impact measures (e.g., for other energy resources, for other producers, for other transporters) and may accordingly use the environmental impact measure to identify the optimum energy sources for a user. For example, the disclosed system may facilitate the submission of a query of the environmental impact measures and financial costs of energy resource producers and/or transporters for a specific consumption location.

In various aspects, the disclosed system implements techniques that utilize distributed ledger technology (DLT) to determine, generate, and/or store various information (e.g., environmental impact measures, transaction data, attributions, environmental efficiency measures, production processes, delivery processes, transaction parties, agreements, environmental impact constraints, and the like). DLT may include various implementation of distributed ledgers including, for example, blockchain implementations, including such as public blockchains and/or private blockchains. It should be understood that references to "blockchain" within the present disclosure may correspond to DLT generally, blockchain technology in particular, or both. The disclosed system may additionally facilitate storage of data required for the calculation of the energy resource environmental impact measure or cost. Energy producers, transporters and consumers may input information concerning the carbon attribute of their product or service, or such information may come from authoritative third parties. Information concerning the energy resource may be received and may identify a type of energy resource and parties for the energy transaction.

The disclosed system may additionally include an environmental impact attribution system that utilizes a distributed ledger technology (DLT) database in which all data required to calculate an energy resource's carbon attribute, related environmental impact, or cost are stored. This information may be automatically updated by digitally accessing authoritative third party data sources. For example, this information may be automatically updated by accessing data stored in the same (or another) DLT database. One such system is described in U.S. application Ser. No. 17/178,028, filed on Feb. 17, 2021, which is incorporated herein by reference for all purposes.

Similar techniques may be used to determine transaction requirements such as federal, state, local and industry regulations, rules, standards and specifications that affect an energy resource transaction. Such techniques may automatically update environmental impact measurements and cost calculations when a data change occurs. When creating and executing energy resource transactions, the system may either advise the parties of the need to amend their transaction (e.g., a buy/sell smart contract, a transportation contract) or may automatically generate an update to the agreement (e.g., the corresponding transaction's smart contract)

to comply with identified requirements. Such updates may then affect activity initiated by the smart contract (e.g., payments made, suppliers/distributors selected).

The disclosed system may additionally facilitate originating, negotiation, and execution of contracts for energy resource transactions. Energy resource transactions may include, e.g., a buy/sell agreement at an energy resource receipt point, an energy resource shipping agreement between a receipt and delivery point, a buy/sell agreement at an energy resource delivery point, and/or any other energy transaction or service involving multiple parties. Additional details regarding such as system may be found in U.S. application Ser. No. 17/178,028, filed on Feb. 17, 2021, and U.S. application Ser. No. 17/006,329, filed on Aug. 28, 2020, both of which are incorporated herein by reference for all purposes. For agreements created using this system, one or more requirements may be identified as explained below, and an update may be generated for the transactions based on these requirements.

In various aspects, energy transactions as discussed herein may include any transaction concerning one or more energy resources. For example, energy transactions may include production of, transportation of, financing of, delivery of, storage of, and/or usage of energy or energy resources. For example, energy resources may include natural gas, oil, or natural gas or oil derivatives, coal, bio-energy, hydrogen, ammonia-based, energy production equipment, electricity, solar panels, wind turbines, particular quantities, or amounts of energy. Additional or alternative types of energy transactions and/or types of energy resources may be readily apparent to one skilled in the art based on the contents of the present disclosure. All such energy transactions and energy resources are hereby contemplated within the scope of the present disclosure. Furthermore, the examples discussed herein focus on energy transactions concerning natural gas. It should be understood that similar techniques may be used to process any type of energy transaction (or other types of transaction unrelated to the energy industry).

FIG. 1 illustrates a production and fulfillment flow 180 for various energy resources according to an exemplary embodiment of the present disclosure. The production and fulfillment flow 180 may depict various steps, phases, and/or processes performed in producing and consuming various energy resources in order to provide energy (e.g., heat, electricity, and the like) to an end user (e.g., a home, business, and/or individual). In particular, the production and fulfillment flow 180 may depict processes performed for coal, natural gas, hydrogen, solar, nuclear, wind, hydro and other energy resources.

Starting with coal, a certain amount of coal may be extracted, such as from mines (100). For example, extracted coal may include one or more of anthracite, bituminous, sub-bituminous, and lignite coal. The coal may then be transported (e.g., by rail, by truck, by barge) to a production facility, such as a coal-burning electricity plant (101). At the production facility, the coal is then burned to produce heat, electricity, and the like (102).

Natural gas is produced (e.g., at a natural gas well) (104) and processed (105) for transportation (e.g., as liquid natural gas). Renewable natural gas (RNG) may also be produced at an RNG plant (115) and similarly processed (105) for transportation. For example, RNG may be produced by sequestering carbon from the atmosphere to produce natural gas for further use.

Natural gas may be transported (106) via intrastate and/or interstate pipelines. For example, the natural gas may be transported to a power plant and/or to end users (e.g., residential, business, and/or industrial users). Once at a power plant or other production facility, the natural gas is then combusted (108) to produce electricity. If transported to end users, the natural gas may travel through a pipeline compressor (109), such as an intrastate or interstate pipeline compressor. Transportation of the natural gas may be handled by distribution companies (110) that maintain their own facilities and equipment. In such instances, the natural gas may further proceed through a distributor's compressor (111) en route to the end users. The natural gas may then be combusted at the end user's facility (114).

Hydro turbines (122) and/or wind turbines (121) may also be used to produce electricity. Similarly, photovoltaic panels (120) or nuclear plants (119) may be used to produce electricity for end user consumption. Hydrogen may be produced (125) using various processes, such as natural gas reforming, gasification, electrolysis, renewable liquid reforming, and/or fermentation hydrogen production processes. The hydrogen is then transported (130) to an end user and/or power plant for combustion (e.g., to produce electricity, heat) or is used as a chemical feedstock to produce a product.

Electricity produced by central generation power plants or by distributed generation, such a wind and solar or energy stored in any type of energy storage unit, is then transmitted to end users. In particular, power may be transmitted (123) to end user facilities, where it is consumed (124).

Each of the steps in this process may generate an environmental impact (e.g., emissions, pollutants, water usage). It may be necessary to determine the environmental impact for one or more of the steps or processes performed in the production and fulfillment flow. For example, a particular producer may want or need to determine the environmental impact attributable to their portions of a production and fulfillment flow (e.g., to track certain environmental goals). As another example, an end user may want to know the environmental impact of the electricity or other energy resource they consume.

Figure 2:
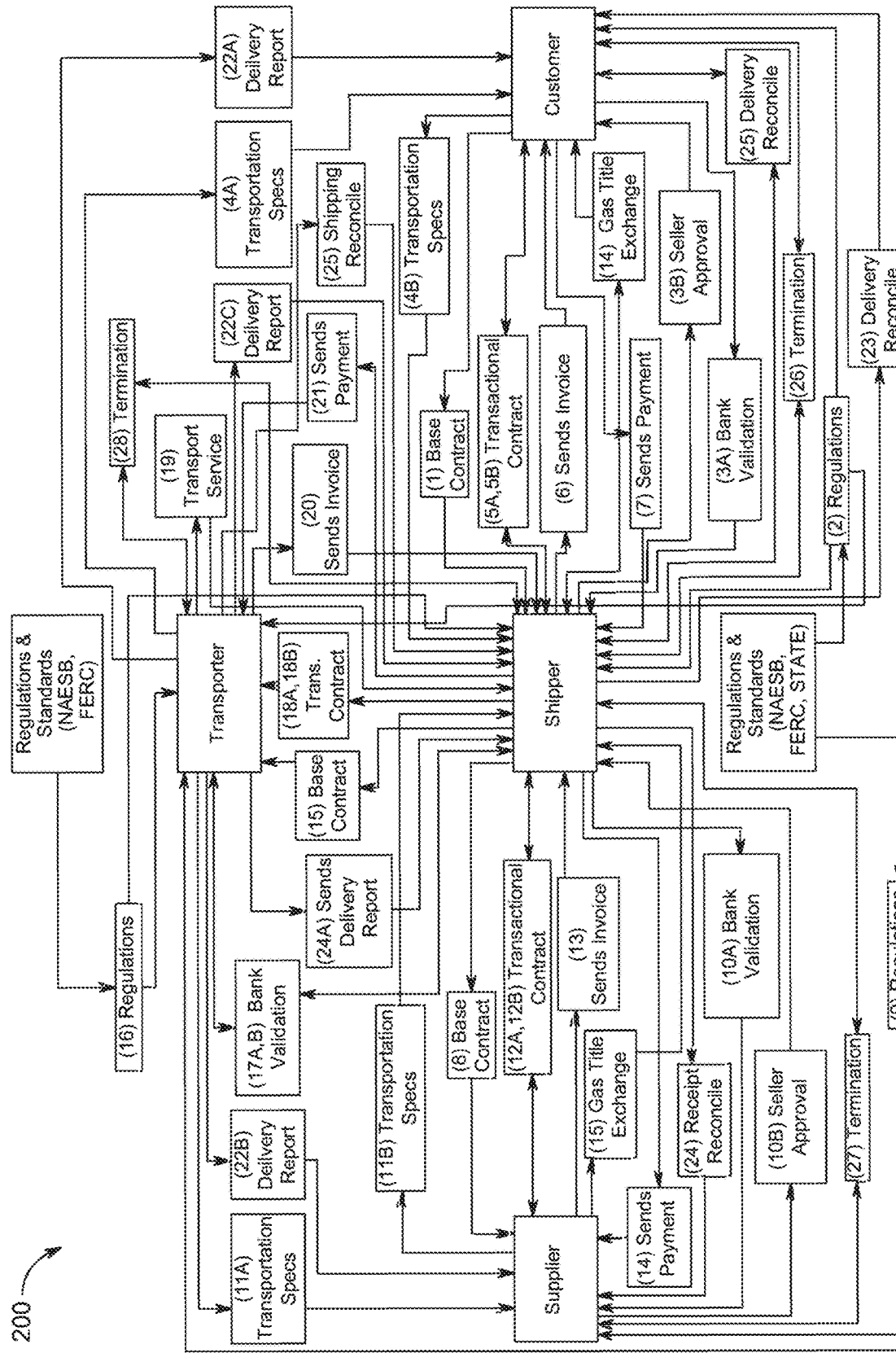
FIG. 2 illustrates a transaction management flow for a natural gas energy transaction, representative of the complexity of a typical energy transaction, according to an exemplary embodiment of the present disclosure.

Activities within the production and fulfillment flow may be performed according to one or more transactions and agreements. For example, FIG. 2 depicts a transaction management flow 200 for an energy transaction according to an exemplary embodiment of the present disclosure. In particular, FIG. 2 may depict a transaction management flow 200 for a buy/sell agreement at a receipt point, a transportation agreement on a pipeline or distribution company from receipt to delivery point, and a buy/sell agreement at a delivery point. The transaction management flow 200 includes three types of transactions, all of which may correspond to one or more of the transaction steps in the transaction and fulfillment flow 180. A supplier and shipper transaction is depicted where the supplier is the seller of the energy resource (e.g., an energy commodity) and the shipper is the buyer. A shipper and transporter transaction is depicted where the transporter is the seller of the energy resource (e.g., shipping capacity) and the shipper is the buyer. A shipper and customer transaction is depicted where the shipper is the seller of the energy resource (e.g., the energy commodity) and the customer is the buyer of the energy resource. The transaction management flow 200 represents a transaction flow between four different parties: a supplier, a shipper, a transporter, and a customer. In practice, transaction flows concerning a particular energy resource may include many more parties and/or may include many more transactions, greatly increasing the complexity of the transaction flow. The techniques discussed herein may enable transaction flows similar to the transaction flow 200 (and other, more complex, transaction flows) to be better managed, tracked, attributed, and analyzed on an automated basis in order to determine and attribute environmental impact measures for activities performed under the various transactions.

Figure 3:
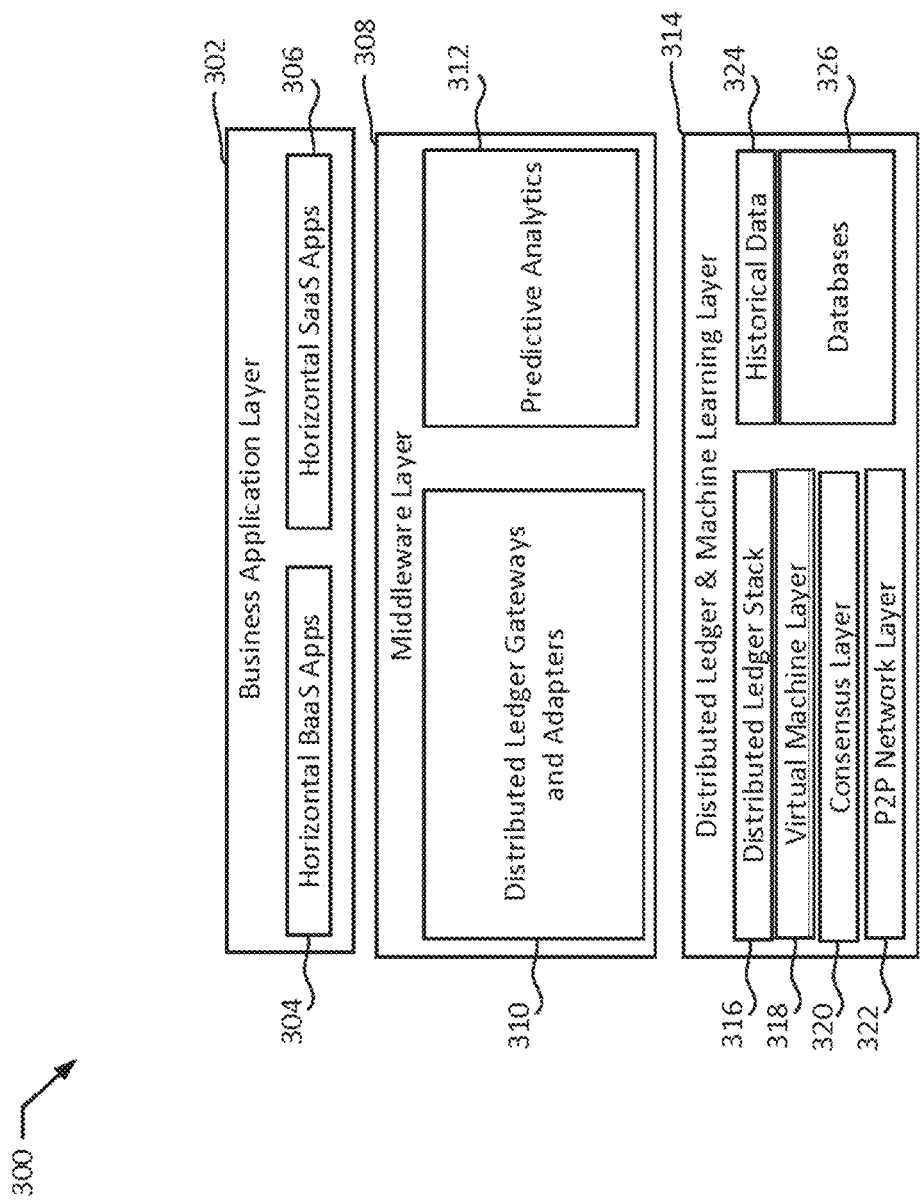
FIG. 3 illustrates a system according to exemplary embodiments of the present disclosure.

FIG. 3 depicts a system 300 according to an exemplary embodiment of the present disclosure. The system 300 may be configured to receive and process information regarding energy transactions (e.g., negotiation information, status information, fulfillment information, security information, and the like) to execute actions via smart contracts and to integrate with a distributed ledger to store the information or determine whether the information indicates compliance with a previously negotiated energy transaction. The system 300 may also be used to access and analyze data stored on a distributed ledger to determine and attribute environmental impact measures based on energy transactions. The system 300 includes a business application layer 302, a middleware layer 308, and a distributed ledger and machine learning layer 314.

The application layer includes horizontal applications ("apps"), which may be software services or processes executing on computing devices to provide front-end services, integration services, and the like. In particular, the applications may enable the system 300 to integrate with the information technology (IT) systems of users or entities negotiating, contracting, or monitoring compliance for an energy transaction, and/or other users. In particular, the application layer 302 may include horizontal software as a service (SaaS) applications 306 and horizontal blockchain as a service (BaaS) applications 304. The SaaS applications 306 may be configured to integrate services provided by the system 300 (e.g., by the middleware layer 308 and/or the distributed ledger and machine learning layer 314) with IT systems associated with users or other entities accessing the system 300. The BaaS applications 304 may provide services that improve access to, visualization of, and integration with distributed ledger technologies used by the system 300. For example, the BaaS applications 304 may provide integration services that allow users to view a distributed ledger containing transactions related to an energy transaction. As another example, the BaaS applications 304 may enable users to create or view individual entries (i.e., individual transactions) on a distributed ledger related to a particular energy transaction. As a further example, the BaaS applications 204 may enable users to generate and process queries of energy transactions to determine and attribute environmental impact measures (e.g., based on different fulfillment flows, for different energy resources).

The middleware layer 308 may be configured to provide a communicative interface between the business application layer 302 and the distributed ledger and machine learning layer 314. For example the middleware layer 308 may include a business rules engine (discussed further below) configured to create and store requirements for different types of energy transactions. For example, the business rules engine may receive and/or generate business logic derived from customer and collaborator research and behavior. Additionally or alternatively, the business rules engine may receive market relevant documentation such as federal, state, local and industry regulations, rules, standards and specifications and applicable technical reports. The system 300 may derive requirements and may store the requirements in a contract codex or other data storage system. So called "codex data" stored in the contract codex may enforce industry or business standards on the transaction and the smart contracts may extract and incorporate relevant codex data as a contract is negotiated and fulfilled. For example, as transaction parties select a contract template and begin to input unique information (such as state, delivery pipeline, volume, price receipt point, etc.) to describe the transaction desired, the contract codex and/or the business rules engine may add appropriate information to the contract template selected to create a contract. For example, a contract template may be updated to include information reflecting relevant state, delivery pipeline, and/or receiving distributor requirements depending on the state, delivery pipeline, and/or receiving distributor selected by the contracting parties. This information added to the smart contract may govern the transaction's operation once the smart contract is agreed to and consummated.

The business rules engine may also include an environmental attribution engine that retrieves data stored within a distributed ledger (e.g., within a contract codex) to generate environmental impact measures for energy transactions. The specific techniques for generating the environmental impact measures are discussed in greater detail below. The environmental attribution engine may then attribute the environmental impact measures to one or more parties of a corresponding energy transaction.

The middleware layer 308 includes distributed ledger gateways and adapters 310 and predictive analytics services 312. The distributed ledger gateways and adapters 310 may be configured to provide communicative services between the BaaS applications 304 and distributed ledgers storing information related to an energy transaction. For example, the distributed ledger gateways and adapters 310 may receive a request from a BaaS application 304 to view transactions on a distributed ledger related to a particular energy transaction. The distributed ledger gateways and adapters 310 may be configured to communicate with the distributed ledger to identify corresponding transactions and to provide copies of the identified transactions to the BaaS applications 304. The predictive analytics services 312 may provide data analysis, machine learning, artificial intelligence, and similar services for use in analyzing data related to energy transactions. For example, the predictive analytics services 312 may include statistical analysis libraries, artificial intelligence libraries, machine learning libraries, applications configured to perform data analysis, machine learning, or artificial intelligence analysis, and the like.

The distributed ledger of the layer 314 may be configured to directly interact with one or more distributed ledgers storing information regarding energy transactions and/or to provide machine learning or other data analysis services. For example, the distributed ledger and machine learning layer 314 includes a distributed ledger stack 316. The distributed ledger stack 316 may be configured to interact with and/or at least partially implement a distributed ledger that is used to store and verify energy transaction information. For example, the distributed ledger stack 316 may act as a node of the distributed ledger and/or may interact with or otherwise interface with nodes of the distributed ledger. In addition, the distributed ledger and machine learning layer 314 includes a virtual machine layer 318, a consensus layer 320, and a peer-to-peer (P2P) network layer 322. A virtual machine layer 318 may implement one or more virtual computing devices (e.g., virtual processors, virtual memories) configured to execute as nodes of a distributed ledger and/or configured to execute software or applications to directly interface with nodes of a distributed ledger. For example, nodes of the distributed ledger may communicate using the P2P network layer 322, which may provide communication services according to one or more P2P communication protocols (e.g., the BitTorrent protocol, the Bitcoin P2P protocol, the Advanced Peer-to-Peer Networking (APPN) protocol, and the like). The consensus layer 320 may be used to negotiate consensus according to various distributed ledger configurations. For example, the consensus layer 320 may be used to negotiate between nodes of a distributed ledger to verify valid transactions to add to the distributed ledger, thereby reaching consensus. As a specific example, the consensus layer 320 may implement one or more consensus protocols such as a proof of work consensus protocol, proof of stake consensus protocol, delegated proof of stake consensus protocol, practical Byzantine fault tolerance protocol, ripple protocol, and the like. Transactions received to be added to a distributed ledger may first have to be validated according to the consensus protocol before being added to the distributed ledger (e.g., within a block of the distributed ledger). The proposed approach is designed to be utilized in any type of current and future version of DLT.

The distributed ledger and machine learning layer 314 may also include historical data 324. Historical data 324 may be used by the predictive analytics services 312. For example, the historical data 324 may store data regarding energy transactions, interactions with the distributed ledger, negotiations regarding energy transactions, compliance data associated with energy transactions, or any other operations performed by the system 300 (or discussed herein). In particular, the historical data 324 may be stored in one or more databases 326. In certain instances, the historical data 324 may additionally or alternatively be stored on a distributed ledger. For example, data stored by the system 300 (or any other system discussed herein) may be stored using an elastic file system or a distributed file system, such as an InterPlanetary File System (IPFS). IPFS is a peer-to-peer distributed file system that may be used to connect stored data to a common distributed ledger infrastructure. Such distributed file system implementations may be preferable to more conventional storage techniques (e.g., server-based and/or local databases). For example, IPFS has no single point of failure and nodes implementing the distributed ledger used to store the data do not need to trust each. Furthermore, distributed file systems may support distributed content delivery, which saves bandwidth and prevents direct denial of service (DDoS) attacks, which other data communication protocols (e.g., HTTP) may remain vulnerable to.

Figure 4A:
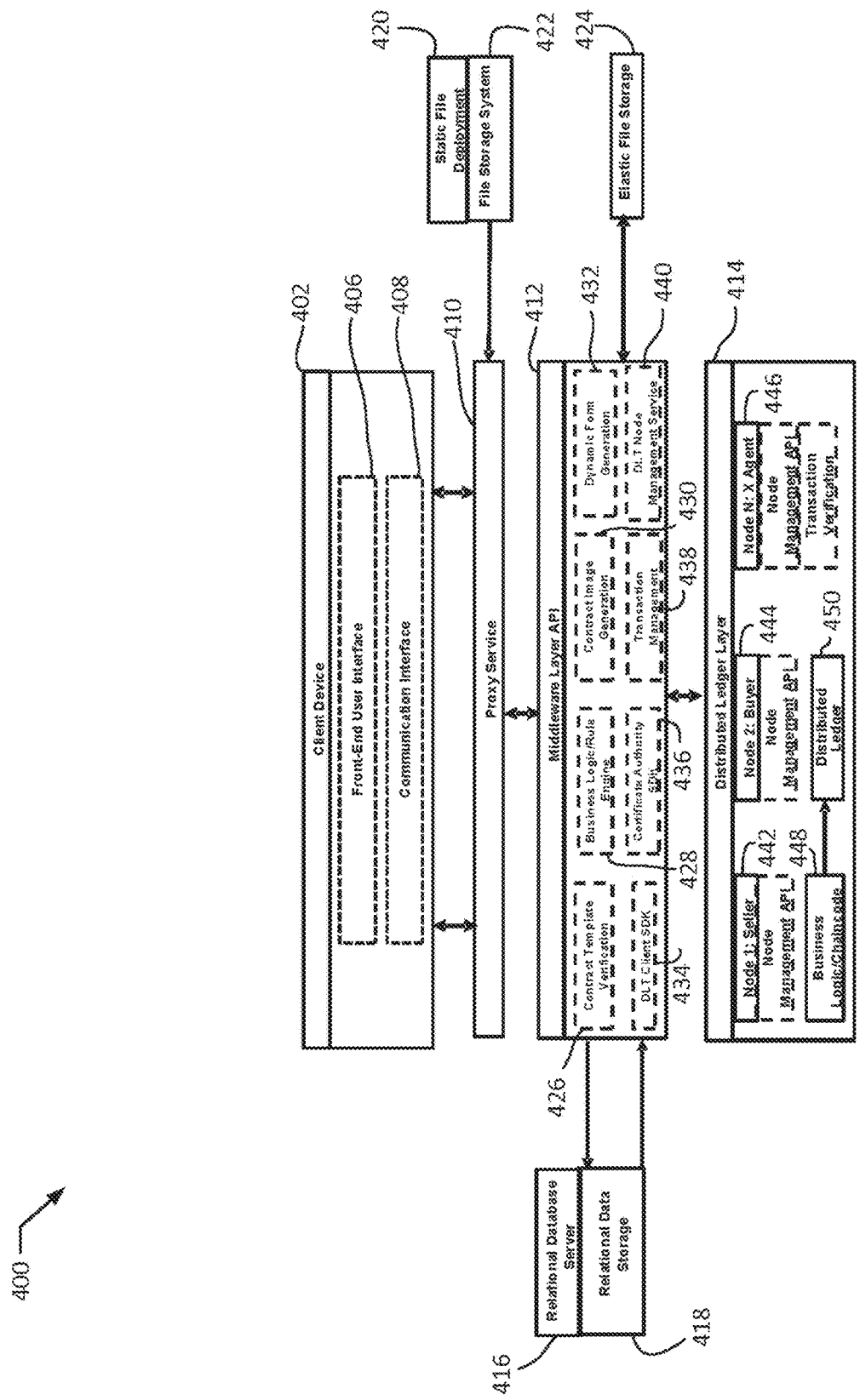
FIG. 4A-4B illustrate systems for determining and storing environmental impact attributions for energy transactions according to exemplary embodiment of the present disclosure.

FIG. 4A depicts a system 400 for creating smart contracts for energy transactions according to exemplary embodiment of the present disclosure. The system 400 includes a client device 402, a front-end user interface 406, a communication interface 408, a proxy service 410, a middleware layer API 412, and a distributed ledger layer 414. The client device 402 may be a user computing device (e.g., a personal computer, a laptop computer, a smartphone, a tablet computer, a wearable computing device) associated with a user. The client device 402 may be used to access various user interfaces associated with different services provided by the system 400. For example, the client device 402 may include or otherwise access one or more user interfaces to negotiate, prepare, and/or execute energy transaction contracts. As another example, the client device 402 may include or otherwise access one or more user interfaces to generate and attribute environmental impact measures to various parties of an energy transaction. Interfaces provided by the client device 402 may include graphical interfaces (e.g., as depicted) and/or other types of interfaces (e.g., text-based interfaces, command line interfaces). In certain instances, the interfaces may be accessible via a web interface. In additional or alternative instances, the interfaces may be accessible via local software, smartphone applications, command line applications, and the like. The client device 402 also includes a communication interface 408. The communication interface 408 may be used to provide synchronous or asynchronous communication services between the interfaces provided by the front-end user interface 402. For example, the communication interface 408 may enable an environmental attribution interface to communicate with a DLT database (e.g., via the proxy service 410) to access updated energy transaction information. The communication interface 408 may use one or more communication protocols, such as the hypertext transfer protocol (HTTP), the advanced message queueing protocol (AMQP), and the like.

The proxy service 410 may be configured to facilitate communication between the client device 402 and the middleware layer API 412. For example, the proxy service 410 may provide one or both of load-balancing services and static caching services. For example, the middleware layer API 412 may be implemented by one or more computing devices, and the proxy service 410 may provide load-balancing services by selecting particular computing devices that implement the middleware layer API 412 used to provide services to particular instances of the front-end user interface 402 based on current operating loads (e.g., computing resource usage, processor usage, memory usage). For example, the proxy service 410 may select a particular computing device such that the average operating loads are balanced across the computing devices implementing the middleware layer 412. The proxy service 410 may also provide static caching services that store one or more resources utilized by the client device 402 for quick retrieval by the front-end interface 402. For example, the proxy service 410 may interact with a static file deployment 420. For example, the static file deployment 420 may implement a file storage system 422 (e.g., a local database, a database implemented by one or more servers, a distributed database implemented at least in part by a blockchain). For example, the file storage system 422 may store templates (e.g., contract templates) used by the front-end user interface 402.

The middleware layer API 412 may be configured to provide multiple services used in creating, negotiating, validating, executing, storing, and monitoring compliance of energy transactions and corresponding smart contracts in an interactive manner. In particular, the middleware layer API 412 includes a contract template verification service 426, a business logic/rules engine 428, a contract image generation service 430, a dynamic form generation service 432, a DLT client standard development kit (SDK) 434, a certificate authority SDK 436, a transaction management service 438, and a DLT node management service 440. The contract template verification service 426 may be used to verify one or more aspects of negotiated contracts prior to execution of the contract. For example, the contract template verification 426 may be configured to ensure that a proper contract template is used to negotiate an energy transaction. As a specific example, the contract template verification service 426 may be configured to ensure that the proper contract template is used for a particular energy resource or service (e.g., oil, natural gas or buy/sell, transportation) of the energy transaction.

The dynamic form generation service 432 may provide schema specification for the energy transaction and may serve as an endpoint for the seller and buyer interfaces 404, 406. For example, the schema specification may identify types of data that can be added to a contract template for the energy transaction. For example, information (e.g., buyer information, seller information, trade volume information, price information, d-point (delivery point) information) may be added to the contract template during negotiation and preparation of the contract. The schema may specify which types of data may be added to the contract template and where the information is included within the contract template (e.g., within the text of the contract template) to generate a final contract. Furthermore, by creating an endpoint for the seller and buyer interfaces 404, 406, both the seller and buyer (and any other transaction parties) may be able to view data added to the contract as the contract is negotiated.

The contract image generation service 430 may be configured to generate images of finalized contracts. Once a contract is agreed to by the seller and the buyer, the contract may be finalized as an image of the finalized copy of the contract (e.g., the contract template incorporating any data added during negotiation and preparation, buyer and seller information, buyer and seller signature). The contract image generation service 430 may then store the image of the finalized copy of the contract. For example, the contract image generation service 430 and/or the middleware layer API 412 may communicate with an elastic file storage 424. The elastic file storage 424 images of finalized contracts, along with corresponding information (e.g., a transaction identifier, buyer information, seller information). In certain instances, the contract image generation service 430 may include a hash corresponding to a transaction or block on a distributed ledger corresponding to the finalized copy of the contract.

The DLT client SDK 434 may provide communication services with the distributed ledger layer 414. For example, the DLT client SDK 434 may provide communication services to commit, query, and verify data stored on a distributed ledger 450 of the distributed ledger layer 414 and/or on a distributed database implemented by a distributed ledger 450. As explained further below, one or more transactions may be added to the distributed ledger 450 during the creation, negotiation, and finalization process for a contract of an energy transaction. The DLT client SDK 434 may be used by other services provided by the middleware layer 412 to communicate with the distributed ledger 450 to add the transactions (e.g., after consensus is reached by one or more nodes implementing the distributed ledger). Additionally or alternatively, one or more services of the middleware layer API 412 may retrieve and/or verify data stored on the distributed ledger 450. In such instances, the DLT client SDK 434 may also provide communication services with the distributed ledger 450.

The certificate authority SDK 436 may provision and verify certificates to individual parties to energy transactions (e.g., parties negotiating a contract, third parties, attorneys or other representatives) and/or to computing services interacting with the distributed ledger 450. When adding transactions to the distributed ledger 450, the transactions may be required to be signed by a valid certificate. Accordingly, a certificate may be received from one or more parties to an energy transaction (e.g., a seller, a buyer, a transporter) and included within a transaction to be stored on the distributed ledger 450. Prior to providing the transaction to the DLT client SDK 434 for storage on the distributed ledger 450, the certificate authority SDK 436 may be used to verify that the certificate(s) included within the transaction are valid (e.g., were issued to the one or more parties by the certificate authority SDK 436 and/or another certificate issuing authority).

The business logic/rule engine 428 may be configured to automatically access and apply certain requirements (e.g., business requirements, regulatory requirements) during negotiation and/or fulfillment of an energy transaction. For example, the business logic/rules engine 428 may be used to specify logic (e.g., as business logic, as a micro-service) that automatically implements a requirement of the contract as the energy transaction is fulfilled. As a specific example, payment under the contract may be staged such that payment automatically issues when particular percentages (e.g., 25%, 50%, 75%, 100%) of an energy resource is delivered by the seller to the buyer. In such instances, as proof is provided that a particular percentage of the energy resource was delivered, the business logic may be executed by the business logic/rules engine 428 to verify the proof and to automatically trigger or complete payment under the contract. In certain instances, the business logic created by the business logic/rules engine 428 may be implemented as an interactive smart contract executing on the distributed ledger 450. For example, the interactive, smart contract may be implemented using a protocol (e.g., the Ethereum protocol and the like) configured to be executed on a blockchain (e.g., the Ethereum blockchain, a private blockchain, and the like).

Figure 4B:
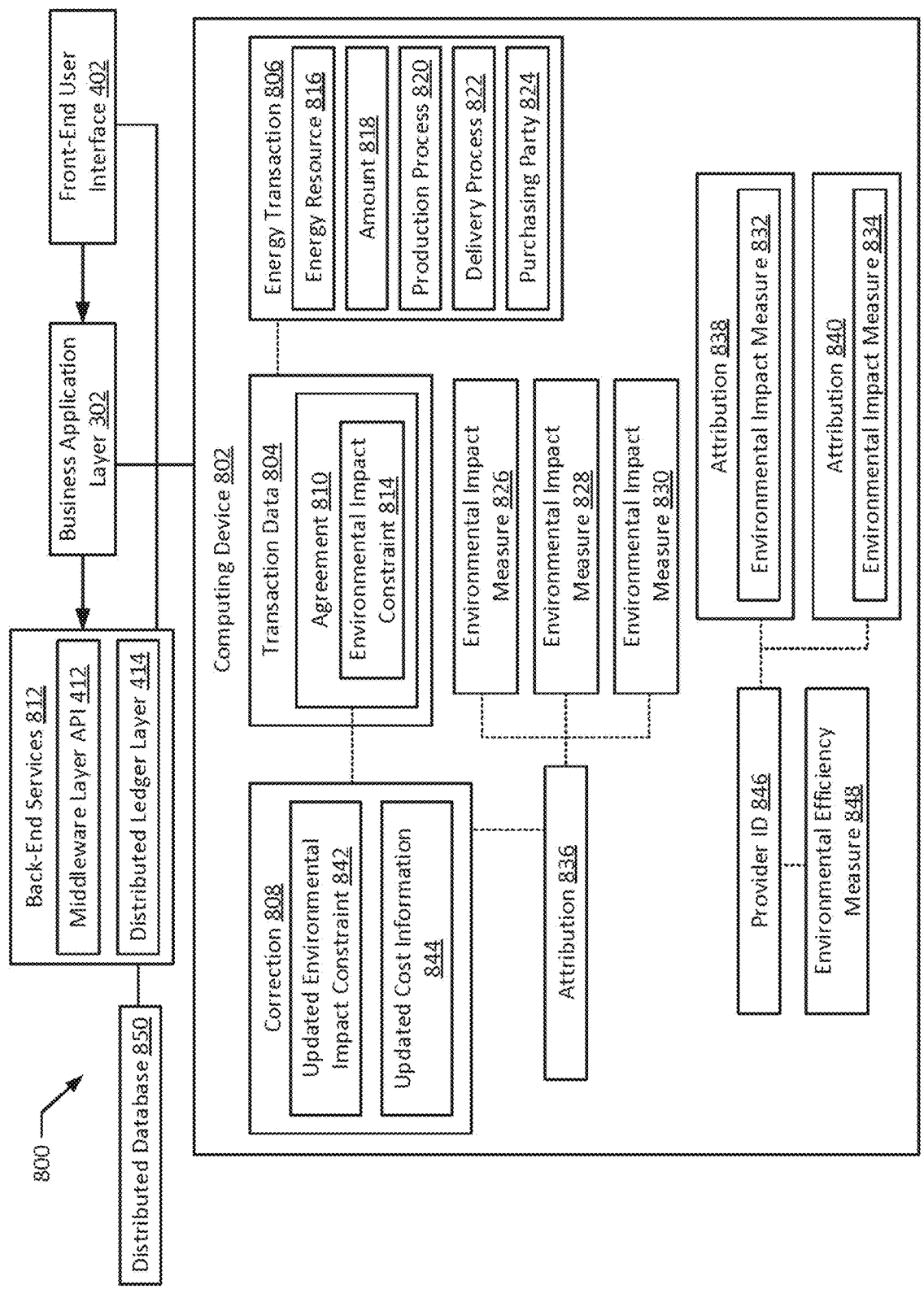

The business logic/rules engine 428 may also access a contract codex (e.g., to determine and attribute environmental impact measures, to determine when a previously-agreed to contract needs to be updated). For example, FIG. 4B depicts a system 800 according to an exemplary embodiment of the present disclosure. The system 800 includes a computing device 802, which may be configured to cooperate with various services of the systems 300, 400. For example, the system 800 includes the front-end user interface 402, the business application layer 302, and back-end services 812 that include the middleware layer API 412 and the distributed ledger layer 414.

The transaction management service 438 may be configured to monitor storage of transactions on the distributed ledger 450. For example, the transaction management service 438 may be configured to ensure that a newly-added transaction is properly stored in a new block of the distributed ledger 450, and that the newly-added transaction is reflected on the blocks stored on all nodes implementing the distributed ledger. If one or more nodes of the distributed ledger 450 failed to properly store the newly-added transaction, the transaction management service 438 may invalidate any stored copies of the newly-added transaction. For example, the transaction management service 438 may add an invalidation transaction to the distributed ledger 450, indicating that any previously stored copies of the newly-added transaction are invalid. The transaction management service 438 may additionally or alternatively provide a notification to the seller and/or the buyer (e.g., via the interfaces 404, 406) that indicates the newly-added transaction was not successfully stored on the distributed ledger 450 and needs to be attempted again.

The DLT node management service 440 may be responsible for managing the nodes that implement the distributed ledger 450. For example, the DLT node management service 440 may receive notifications (e.g., from computing devices implementing the nodes) as nodes are added to or removed from implementing the distributed ledger 450 (e.g., removed from or added to a network of computing devices responsible for implementing the distributed ledger 450). In particular, the DLT node management service 440 may communicate with a node management API executing on the nodes to determine when nodes are added to or removed from implementing the distributed ledger 450. In certain instances, the DLT client SDK 434 may communicate with the DLT node management service 440 to identify which nodes can be communicated with to add transactions to the distributed ledger 450.

The middleware layer API 412 may be configured to communicate with one or more servers while implementing the above-described services. For example, the system 400 also includes a database server 416 implementing a data storage 418. One or more of the services discussed above may be configured to store data in the data storage 418 and/or to receive data from the data storage 418.

Additionally or alternatively, further services provided by middleware layer API 412 may be readily apparent to one skilled in the art in light of the present disclosure. All such additional or alternative services are hereby contemplated within the scope of the present disclosure.

The distributed ledger layer 414 may be configured to implement the distributed ledger 450. In particular, the distributed ledger layer 414 includes nodes 442, 444, 446 and may be configured to implement the distributed ledger 450 according to one or more distributed ledger protocols (e.g., a blockchain protocol, the Ethereum protocol). In certain instances, one or more of the nodes may be implemented by computing devices associated with one or more transaction parties. For example, the node 442 may be implemented by a seller in an energy transaction, the node 444 may be implemented by a buyer in an energy transaction, and the node 446 may be implemented by a third party agent (e.g., a mediator, a disinterested third party, and the like). Additionally or alternatively, the distributed ledger 450 may be implemented externally from the distributed ledger layer 414 (e.g., as a public blockchain). In such instances, the distributed ledger layer 414 may facilitate communication with the distributed ledger 450.

Additionally, the distributed ledger layer 414 includes a business logic/chaincode service 448. The business logic/chaincode service 448 may be configured to monitor for business logic (e.g., interactive smart contracts) executing on the distributed ledger 450. The business logic/chaincode service 448 may then analyze transactions for data indicating compliance with the business logic and may perform additional actions, such as processing payments and/or transfers (e.g., electronic funds or cryptocurrency transfers) in accordance with the conditions identified within the business logic (e.g., interactive smart contracts).

All or part of the system 400 may be implemented by a computing device. For example, the client device 402, the proxy service 410, the middleware layer API 412, the distributed ledger layer 414 (e.g., the nodes 442, 444, 446), the static file deployment 420, the file storage system 422, database server 416, the data storage 418, and/or the elastic file storage 424 may be implemented by one or more computing systems. As a specific example, the one or more computing systems may include one or more processors and/or one or more memories. The one or more memories may store instructions which, when executed by the one or more processors, cause the one or more processors to implement at least one operational feature of the client device 402, the proxy service 410, the middleware layer API 412, the distributed ledger layer 414 (e.g., the nodes 442, 444, 446), the static file deployment 420, the file storage system 422, database server 416, the data storage 418, and/or the elastic file storage 424.

FIG. 4B illustrates a system 800 for determining and storing environmental impact attributions for energy transactions according to an exemplary embodiment of the present disclosure. In particular, the system 800 includes a computing device 802, which may be configured to determine environmental impact attributions for energy transactions. The system 800 includes the front-end user interface 406, the business application layer 302, backend services 812, and a distributed database 850. The backend services 812 include the middleware layer API 412 and the distributed ledger layer 414. In certain implementations, the distributed database 850 may be implemented by one or more of the file storage system 422, the elastic file storage 424, and/or the relational data storage 418. In additional or alternative implementations, the distributed database 850 may be implemented by one or more nodes of a distributed ledger (e.g., the distributed ledger 450). In such instances, the distributed ledger layer 414 may be used to access the distributed database 850 (e.g., via one or more networks). In additional or alternative implementations, the computing device 802 may be configured to access the backend services via a business application layer 302 (e.g., one or more horizontal BaaS or SaaS Apps 304, 306).

The computing device 802 may be configured to generate environmental impact measures 826, 828, 830 for one or more energy transactions 806. Environmental impact measures 826, 828, 830 may be determined to approximate one or more environmental impacts caused by performing one or more associated actions (e.g., production processes, delivery processes, consumption processes). For example, the environmental impact measures 826, 828, 830 may be determined to estimate one or more of carbon emissions, carbon equivalent emissions, methane emissions, water usage, deforestation, pollutants produced, and the like. In one preferred embodiment, the environmental impact measures 826, 828, 830 are generated to approximate carbon and carbon equivalent emissions. In light of the present disclosure, one skilled in the art may readily recognize one or more additional environmental impacts for which environmental impact measures may be generated. All such environmental impacts and corresponding environmental impact measures are hereby considered within the scope of the present disclosure. The computing device 802 may further generate an attribution 836 identifying a corresponding party or provider to which one or more of the environmental impact measures should be attributed (e.g., on whose behalf the corresponding environmental impacts were incurred).

In certain implementations, the computing device 802 may generate the environmental impact measures 826, 828, 830 in response to a request received from a user. For example, the computing device 802 may receive a request from a front-end user interface 406 (e.g., a front-end user interface 406 executing on a client device 402) associated with a user, such as a party to the energy transaction 806, a regulator, or other user. In additional or alternative implementations, the computing device 802 may generate the environmental impact measures 826, 828, 830 on an automated basis. For example, one or more automated software services (e.g., a smart contract executing on a distributed ledger 450 associated with the energy transaction 806) may request for otherwise cause the computing device 802 to generate and attribute the environmental impact measures 826, 828, 830. In particular, the energy transaction 806 may be associated with one or more environmental impact constraints 814, and the environmental impact measures 826, 828, 830 may be generated on an automated basis to ensure compliance with the environmental impact constraints 814 while the energy transaction 806 is fulfilled.

To generate the environmental impact measures 826, 828, 830, the computing device 802 may retrieve transaction data 804 concerning the energy transaction 806. The transaction data 804 may be retrieved from a distributed database 850 implemented at least in part by one or more distributed ledgers. In particular, the computing device 802 may transmit a request to the distributed ledger layer 414 to retrieve transaction data 804 from the distributed database 850 concerning the energy transaction 806 (e.g., by providing the distributed ledger layer 414 with one or more unique identifiers of the energy transaction 806, corresponding agreements 810, and/or other transaction data 804). In certain instances, the transaction data 804 may be retrieved from a contract codex. The transaction data 804 may include one or more data records stored on the distributed database 850. For example, the transaction data 804 may include an initial transaction record memorializing the formation of an agreement to the energy transaction 806. However, the transaction data 804 may further include subsequent transaction records, which may be added to the distributed database 850 as the energy transaction is fulfilled (e.g., partially fulfilled, fully fulfilled). As a specific example, upon delivering a portion of a corresponding energy resource 816 to a purchasing party 824, a record may be stored on the distributed database 850 that identifies the energy transaction 806, the energy resource 816, and amount delivered under the energy transaction 806, and/or production/delivery information for the particular amount of energy resource 816 that was delivered. Where energy transaction 806 requires multiple deliveries, the transaction data 804 may include multiple transaction records for each delivery. In certain instances, the transaction data 804 may further include a final transaction record indicating that fulfillments of the energy transaction 806 has been completed. The final transaction record may include an identifier of the energy transaction 806 and indication that the energy transaction 806 has been completed. The final transaction record may be created and stored on the distributed database 850 by a party of the energy transaction 806 (e.g., a purchasing party 824) and/or an automated computing process (e.g., a smart contract executing on a distributed ledger for the energy transaction 806).

The computing device 802 may analyze the transaction data 804 to extract certain information regarding the energy transaction 806. For example, the computing device 802 may identify a purchasing party 824 of the energy transaction 806. As another example, the computing device 802 may extract an energy resource 816 of the energy transaction 806, which may specify a type of energy resource 816 delivered according to the energy transaction 806 (e.g., natural gas, coal, nuclear, wind, solar, or other energy resources). The computing device 802 may further extract an amount 818 of the energy resource 816 to be delivered under the energy transaction 806. The purchasing party 824, energy resource 816 and/or the amount 818 may be specified in transaction metadata stored on the distributed database 850. For example, the energy resource 816 may be identified within the transaction record stored on a distributed database 850 concerning the energy transaction 806 (e.g., including a unique identifier of the energy transaction 806). In certain implementations, the energy resource 816 may not specify a particular type of energy resource. For example, the energy transaction 806 may be entered into to provide electricity and may not specify a source of the electricity. In such instances, the energy resource 816 may be identified by analyzing other data records concerning the energy transaction 806. For example, the computing device 802 may receive a transaction record indicating when a certain amounts of electricity are delivered, and may analyze these transaction records to identify the energy resource 816. In particular, such delivery transaction records may identify the facility where the electricity was produced, and the computing device 802 may analyze one or more production transaction records associated with the facility to determine which types of energy resources were used to produce the electricity. For example, production facilities may store transaction records when combusting or otherwise consuming energy resources to produce electricity that is delivered to final consumers. In such instances, these transactions may be analyzed by the computing device 802 to determine which energy resources 816 were used to produce the electricity delivered under the energy transaction 806. In additional or alternative implementations, certain production facilities may have predetermined energy resource profiles (e.g., certain percentages of natural gas, coal, solar) that may be used to determine the energy resources 816 used to produce the electricity delivered under the energy transaction 806.

The computing device 802 may further identify one or more production processes 820 and delivery processes 822 for the energy transaction 806. The production processes 820 may identify how the energy resource 816 delivered under the energy transaction 806 was produced. For example, where the energy resource 816 is natural gas, the production processes 820 may identify that the natural gas 816 was renewable natural gas produced by a sequestration process at a particular production facility. The delivery process 822 may specify how the energy resource 816 was delivered to the final consumer (e.g., the purchasing party 824). For example, where the energy resource 816 is natural gas, the delivery process 822 may specify that the natural gas was delivered via a particular pipeline and passed through compressors associated with a particular provider. In certain instances, more than one production process 820 and/or more than one delivery process may be used to fulfill the energy transaction 806. For example, in certain instances, more than one production and/or delivery provider may be utilized to fulfill the energy transaction 806. As one specific example, where the energy resource 816 is hydrogen, 60% of the delivered natural gas may be produced by a fermentation process and 40% of the delivered natural gas may be renewable natural gas produced by a gasification process. As another example, where the energy resource 816 is hydrogen, 70% of the hydrogen may be delivered by pipeline and 30% of the hydrogen may be delivered by truck.

The transaction data 804 may also include an agreement 810 associated with the energy transaction 806. In particular, the energy transaction 806 and be memorialized in one or more contracts, which may be stored within the distributed database 850 (e.g., within a contract codex). The agreement 810 may describe the finalized terms and requirements for the energy transaction 806. For example, the energy transaction 806 may specify one or more of the energy resource 816, the amount 818, the production process 820, the delivery process 822, and/or the purchasing party 824. In certain instances, the computing device 802 may extract one or more of these aspects of the energy transaction 806 from the agreement 810. For example, the computing device 802 may analyze text of the agreement 810 in order to extract one or more of these components. Additionally or alternatively, the agreement 810 may contain metadata specifying one or more of these components (e.g., metadata added before storing the agreement 810 on the distributed database 850). In still further implementations, the agreement 810 may be a smart contract specifying one or more of these components. As a specific example, the agreement 810 may identify the energy resource 816, the amount 818 to be provided, producing party 824, but may not specify the production process 820 and/or the delivery process 822. In such instances, the computing device 802 may extract the energy resource 816, the amount 818, and the purchasing party 824 from the agreement 810, but may use other techniques (e.g., as described above) to identify the production process 820 and the delivery process 822.

The agreement 810 may also contain environmental impact constraints 814. The environmental impact constraints 814 may specify one or more environmental impact requirements associated with the energy transaction 806. The environmental impact constraints 814 may be created based on an agreement between parties to the energy transaction 806 (e.g., to limit carbon emissions during fulfillment of the energy transaction 806, to require certain production processes be used while producing the energy resource 816). For example, one or more parties to the energy transaction 806 may have an environmental policy (e.g., an internal policy) in place to limit the overall emissions and/or other environmental impacts caused by its corporate activities, and may negotiate the environmental impact constraints 814 to reflect and/or comply with this environmental policy. Additionally or alternatively, the environmental impact constraints 814 may be generated based on one or more regulatory requirements. For example, one or more regulatory requirements may limit the amount of emissions or other environmental impacts that may be caused when producing, delivering, and/or utilizing the energy resource 816. As a specific example, a regulation may limit the amount of carbon emissions or equivalent carbon emissions that may be output per BTU of natural gas.

Based on the identified information for the energy transaction 806, the computing device 802 may generate one or more environmental impact measures 826, 828, 830. In certain implementations, the computing device 802 may generate a first environmental impact measure 826 indicating the environmental impact of producing the energy resource 816, a second environmental impact measure 828 indicating the environmental impact of delivering the energy resource 816, and a third environmental impact measure 830 indicating the environmental impact of consuming the energy resource 816. In additional or alternative implementations, the computing device 802 may compute a single environmental impact measure for the energy transaction 806. For example, the computing device 802 may compute only one of the first environmental impact measure 826, the second environmental impact measure 828, and the third environmental impact measure 830. As another example, the computing device 802 may compute a single environmental impact measure inclusive of producing, delivering, and consuming the energy resource 816.

The techniques used for calculating the environmental impact measures 826, 828, 830 may differ depending on the type of energy resource 816 and/or the production, delivery, and consumption processes 820, 822 used. In particular, the first environmental impact measure 826 may be generated based on the energy resource 816, the amount 818, and the production process 820. The second environmental impact measure 828 may be generated based on the energy resource 816, the amount 818, and the delivery process 82. The third environmental impact measure 830 may be generated based on the energy resource 816, the amount 818, and/or a consumption process (e.g., performed by an end user to consume the energy resource 816 and/or to produce energy using the energy resource 816).

Below are provided example techniques for generating the environmental impact measures 826, 828, 830 for multiple energy resources 816. In practice, it should be understood that these techniques may differ and/or that additional or alternative techniques may be used (e.g., for the same energy resources, for different energy resources). In certain implementations, the below-described techniques may be stored by the computing device 802. In additional or alternative implementations, the below-described techniques (or other techniques used to generate environmental impact measures 826, 828, 830) may be stored in a middleware layer API 412, such as within a business logic/rule engine 428. Furthermore, the below-described techniques are performed to generate environmental impact measures 826, 828, 830 that approximate carbon and carbon equivalent emissions. In implementations where the environmental impact measures 826, 828, 830 are determined to approximate different environmental impacts, the techniques utilized by the system 800 may differ from those described below.

Starting with coal, four main types of coal are commonly produced and consumed in the United States. Each has a different thermal (Btu) value and carbon attribute when combusted. These types are described in Table 1 below (source: U.S. Department of Energy, Energy Information Administration).

TABLE 1

| Type | Carbon Content | Btu/Ton* | % U.S. 2020 Production |
|---|---|---|---|
| Anthracite | 85-97% | 26 MMbtu | <1% |
| Bituminous | 45-86% | 24 MMBtu | ~44% |
| Subbituminous | 35-45% | 18 MMBtu | ~46% |
| Lignite | 25-35% | 14 MMBtu | ~9% |

*MMBtu-million British thermal units

The environmental impact measure 826 for producing coal (e.g., 100 in FIG. 1) may be calculated by multiplying a methane emission percentage of coal production for a particular type of coal produced by the total production of the particular type of coal to determine the total volume of methane emitted by coal type. The type of coal may be identified by the energy resource 816 and/or by the production process 820. Where the environmental impact measure is carbon equivalent emissions, the total volume of methane may then be multiplied by a methane carbon equivalent measure to determine the total volume of carbon equivalent emitted. As used herein, the methane carbon equivalent measure may be scientifically determined based on the effect that methane (e.g., natural gas) has when emitted to the environment, as compared to carbon dioxide emissions to the environment. In various embodiments, the methane carbon equivalent measure may have a value of about 1100-1400 kilograms (e.g., 1315 kilograms) of carbon per dekatherm. The total amount of carbon equivalent emitted may then be divided by the total amount of coal produced for the corresponding type of coal to determine an average carbon equivalent emitted (e.g., as milligrams of carbon per dekatherm). The average carbon equivalent emitted may then be multiplied by the amount 818 of coal purchased to determine the environmental impact measure 826 of producing the goal.

The environmental impact measure 828 for transporting coal (e.g., 101 in FIG. 1) may be calculated by multiplying a carbon emission for a particular coal transportation mode (e.g., rail, barge or truck) by the miles of coal transportation to determine the total volume of carbon emitted by the particular coal transportation mode. The coal transportation mode may be specified by the delivery process 822. A total amount of energy produced by the particular type of transported coal may be determined by multiplying the total volume of coal transported (e.g., in short tons) by the particular transportation mode by the average energy production (e.g., in Btu/Ton) for the type of coal transported. The total volume of carbon emitted may then be divided by the total amount of energy produced and this result may be divided by the miles of coal transportation for the particular coal transportation mode to determine an average carbon emitted for transported coal (e.g., expressed as kilograms of carbon per dekatherm per mile of coal transportation). The average carbon emitted may then be multiplied by the amount 818 of coal purchased and the distance the coal is transported, which may be specified by the delivery process 822 and/or the agreement 810, to determine the environmental impact measure 828 of delivering the coal.

The environmental impact measure 830 for consuming or combusting coal (e.g., 102 in FIG. 1), may be determined per dekatherm of coal combusted at standard temperature and pressure and expressed as kilograms of carbon per dekatherm. This may then be multiplied by the total amount 818 of coal purchased to determine the environmental impact measure 830.

Turning to natural gas, which is assumed to be pure methane, producing natural gas may include two steps: extracting the natural gas from a well (e.g., 104 in FIG. 1) and gathering and processing the natural gas (e.g., 105 in FIG. 1). Thus, an environmental impact measure for producing natural gas may be calculated for each of these steps. The environmental impact measure 826 for producing the natural gas (e.g., 104 in FIG. 1) from a well may be calculated by multiplying a methane emission percentage of natural gas production for the natural gas well used to produce the natural gas by total gas production to determine the total volume of methane emitted. In certain implementations, this may be adjusted by well type. For example, the computing device 802 may include different methane emission percentages for different wells, separated by age, type, and/or geography. The total volume of methane emitted may then be multiplied by a methane carbon equivalent measure to determine the total volume of carbon equivalent emitted. The total volume of carbon equivalent emitted may be divided by the total production by corresponding natural gas well type and expressed as milligrams of carbon per dekatherm. This may then be multiplied by the amount 818 of natural gas purchased to determine the environmental impact measure 826.

The environmental impact measure 826 for gathering and processing natural gas (e.g., 105 in FIG. 1) may be calculated by multiplying a methane emission percentage for natural gas gathering and processing by a total amount of natural gas that is gathered and processed (e.g., nationally, globally, within a particular region, at a particular facility) to determine the total volume of methane emitted by natural gas gathering and processing. The total volume of methane may then be multiplied by the methane carbon equivalent measure to determine the total volume of carbon equivalent emitted. The total volume of carbon equivalent emitted may then be divided by the total amount of natural gas gathered and processed and may be expressed as kilograms of carbon per dekatherm. This amount may then be multiplied by the amount 818 of natural gas purchased to determine the environmental impact measure 826.

The environmental impact measure 828 for transporting natural gas (e.g., 106 in FIG. 1) may be calculated by multiplying a percentage of natural gas lost or unaccounted for by a particular natural gas provider (e.g., identified by the delivery process 822) by the total throughput for the provider (e.g., an intrastate or interstate pipeline) to determine a total volume of methane emitted. The percentage may be determined based on public and/or regulatory filings, such as the provider's most recently filed state or federal rate case. The total volume of methane emitted may be multiplied by the methane carbon equivalent measure to determine the total volume of carbon equivalent emitted. The total volume of carbon equivalent may then be divided by the total throughput for the provider and expressed as kilograms of carbon per dekatherm. This may then be multiplied by the amount 818 to determine a total amount of carbon equivalent emitted as the environmental impact measure 828.

The environmental impact measure 830 of combusting and consuming natural gas (e.g., 108 in FIG. 1) may be determined for one dekatherm of methane combusted at standard temperature and pressure and expressed as kilograms of carbon per dekatherm (e.g., a methane combustion carbon attribute). This may then be multiplied by the amount 818 to determine a total amount of carbon emitted as the environmental impact measure 830.

In certain instances, transporting natural gas may further require the natural gas to pass through a pipeline compressor (e.g., 109 in FIG. 1). In such instances, an additional environmental impact measure 828 for transporting the natural gas may be calculated by multiplying a compressor fuel percentage for the provider by the total throughput for the provider (e.g., an intrastate or interstate pipeline) to determine the total volume of methane compressor fuel combusted. The compressor fuel percentage may be determined based on public and/or regulatory filings, such as the provider's most recently filed state or federal rate case. In additional or alternative instances, a consumer natural gas carbon attribute may be computed for natural gas delivered to an end user. In such instances, the actual fuel charge for these agreements may be converted to dekatherms of natural gas instead of the provider's most recent rate case. The total volume of methane compressor fuel combusted may then be multiplied by the methane combustion carbon attribute (see above) to determine the total volume of carbon emitted. The total volume of carbon emitted may be divided by the total natural gas throughput for the provider and expressed as kilograms of carbon per dekatherm. This may then be multiplied by the amount 818 to determine a total amount of carbon equivalent emitted as the environmental impact measure 828.

Transporting natural gas may further require a distribution company to handle delivery of the natural gas (e.g., 110 in FIG. 1). In such instances, a further environmental impact measure 828 may be determined by multiplying a percentage of natural gas lost or unaccounted for by a particular distributor (e.g., identified by the delivery process 822) by the total throughput for the distributor to determine a total volume of methane emitted. The percentage may be determined based on public and/or regulatory filings, such as the distributor's most recently filed state or federal rate case. The total volume of methane emitted may be multiplied by the methane carbon equivalent measure to determine the total volume of carbon equivalent emitted. The total volume of carbon equivalent may then be divided by the total throughput for the provider and expressed as kilograms of carbon per dekatherm. This may then be multiplied by the amount 818 to determine a total amount of carbon equivalent emitted as the environmental impact measure 828.

The distributor may further utilize a compressor (e.g., 111 in FIG. 1), which may require an additional environmental impact measure 828 to be determined by multiplying a compressor fuel percentage for the provider by the total throughput for the distributor to determine the total volume of methane compressor fuel combusted. The compressor fuel percentage may be determined based on public and/or regulatory filings, such as the provider's most recently filed state or federal rate case. In additional or alternative instances, a consumer natural gas carbon attribute may be computed for natural gas delivered to an end user. In such instances, the actual fuel charge for these agreements may be converted to dekatherms of natural gas instead of the distributor's most recent rate case. The total volume of methane compressor fuel combusted may then be multiplied by the methane combustion carbon attribute (see above) to determine the total volume of carbon emitted. The total volume of carbon emitted may be divided by the total natural gas throughput for the distributor and expressed as kilograms of carbon per dekatherm. This may then be multiplied by the amount 818 to determine a total amount of carbon equivalent emitted as the environmental impact measure 828.

A different environmental impact measure 830 may be calculated for consumers using natural gas as a feedstock (e.g., 114 in FIG. 1). The environmental impact measure 830 may be calculated by methane emission percentage for a consumer's consumption process (which may be specified by the energy transaction 806) by the total amount 818 of natural gas consumed (e.g., as measured by natural gas meter(s) associated with the consumer) to determine the total volume of methane emitted. The total volume of methane emitted may be multiplied by the methane carbon equivalent measure to determine the total volume of carbon equivalent emitted as the environmental impact measure 828.

Different combinations of the above-described environmental impact measures may be calculated depending on the specifics of a particular energy transaction 806. In particular, the production and delivery processes 820, 822 may specify particular production processes or providers used, and the delivery providers/distributors used. In such instances, the computing device 802 will select the appropriate corresponding environmental impact measures for the providers and techniques used to produce and deliver the natural gas.

Where the energy resource 816 is renewable natural gas, an environmental impact measure 826 for producing natural gas in a plant (e.g., 115 in FIG. 1) may be calculated by multiplying a methane emission percentage for the RNG production facility design (e.g., identified by the production process 820) by the total natural gas output for the RNG production facility to determine the total volume of methane emitted. The total volume of methane emitted may be multiplied by the methane carbon equivalent measure to determine the total volume of carbon equivalent emitted. The total volume of carbon equivalent may then be divided by the total amount of natural gas produced by the RNG plant and expressed as kilograms of carbon per dekatherm. This may then be multiplied by the amount 818 to determine a total amount of carbon equivalent emitted as the environmental impact measure 828.

Where natural gas is sequestered to create RNG, a further environmental impact measure 826 (e.g., a negative measure) may be calculated by multiplying a percentage of carbon sequestration (e.g., carbon removed from the environment by converting the carbon-based material into methane for reuse) for the RNG production facility (e.g., identified by the production process 820) design by the total natural gas output for the facility to determine the total volume of carbon sequestration. The total volume of carbon sequestration may be divided by the total volume of natural gas output for the facility and expressed as milligrams of carbon sequestration per dekatherm, a negative number. This may then be multiplied by the amount 818 to determine the environmental impact measure 826.

Where the energy resource 816 is electricity, various sources may be utilized by a production facility to produce the electricity. The resources utilized may change how the environmental impact measure 826 for producing the energy resource is calculated.

Where coal is combusted to produce electricity (e.g., 117 in FIG. 1), the environmental impact measure 826 for producing the electricity may be determined similar to the environmental impact measure 830 for consuming or combusting coal (e.g., at 102 in FIG. 1), described above. Where natural gas is combusted to produce electricity (e.g., 118 in FIG. 1), the environmental impact measure 826 for producing the electricity may be determined similar to the environmental impact measure 830 for consuming or combusting natural gas (e.g., at 108 in FIG. 1), described above.

For other consumed resources, the computing device 802 may assume a standard carbon emission rate. The standard rate may then be multiplied by the amount 818 of electricity purchased to determine the environmental impact measure 826. As one example, for nuclear fusion, photovoltaics (solar), wind turbine, and hydro turbine the computing device 802 may assume a standard emission rate of 0 mg of $CO_2$/kWh. Thus, the environmental impact measure 826 for producing electricity using these resources may be 0 mg of $CO_2$. In instances where a particular electricity generation facility uses multiple energy resources to generate electricity, these sources (and their corresponding environmental impact measures 826) may be averaged according to the proportion of the facility's electricity generated using each energy resource.

A separate environmental impact measure 828 may be calculated for transmitting/transporting electricity (e.g., 123 in FIG. 1). For example, the environmental impact measure 838 may be calculated by dividing the U.S. annual transmission and distribution line loss by the total U.S. Kilowatt hours consumed, which may be expressed as a percentage. This percentage may then be multiplied by the amount 818 to determine a total amount of electricity loss in transmission. This may then be multiplied by the emission rate for the electricity source (described above) to determine the environmental impact measure 828.

Turning to hydrogen, which is assumed to be pure hydrogen (e.g., $H_2$), producing hydrogen (e.g., 125 in FIG. 1) may be done using one or more production processes, such as natural gas reforming, gasification, electrolysis, renewable liquid reforming, and/or fermentation. Environmental impact measures 826 for producing hydrogen may be generated differently depending on the production process 820 used to produce the hydrogen associated with the energy transaction 806.

For hydrogen produced by natural gas reforming, the environmental impact measure 826 may be generated by multiplying a methane emission percentage for a particular producer of the hydrogen by the producer's total natural gas consumption (e.g., as measured by natural gas meter(s) recording the producer's natural gas consumption) to determine the total volume of methane emitted by the producer. The methane carbon equivalent measure may then be multiplied by the total volume of methane emitted to determine the total volume of carbon equivalent emitted by the producer. The total volume of carbon equivalent emitted may then be divided by the total volume of hydrogen produced by the processor. Thus may then be multiplied by the amount 818 to determine the environmental impact measure 826. Similar techniques may be used to determine the environmental impact measure 826 for hydrogen produced using renewable liquid reforming, but with the equivalent carbon output determined based on renewable natural gas (e.g., using techniques similar to those discussed above in connection with 105 of FIG. 1).

For hydrogen produced by gasification, the environmental impact measure 826 may be generated based on the amount of coal combusted by a particular producer for the hydrogen, similar to the environmental impact measure 830 for 102 in FIG. 1, discussed above, to determine the total amount of carbon emitted by the producer. The total amount of carbon may then be divided by the total amount of hydrogen produced by the particular producer. This may then be multiplied by the amount 818 to determine the environmental impact measure 826. Where other types of resources are combusted to produce the hydrogen (e.g., biomass), similar processes may be used with different combustion emission rates.

For hydrogen produced by electrolysis, the environmental impact measure 826 may be generated based on the amount of electricity used by a particular producer of the hydrogen. For example, a total carbon output for the electricity used by the producer may be determined using the above-discussed techniques. The total carbon output may then be divided by the total amount of hydrogen produced by the producer. This may then be multiplied by the amount 818 to determine the environmental impact measure 826.

For hydrogen produced by fermentation, the environmental impact measure 826 may be generated by determining a particular producer's total carbon output based on carbon emissions and carbon sequestration provided by the fermentation process.

An environmental impact measure 830 for transporting hydrogen may be determined by multiplying a predetermined carbon emission rate for the corresponding transportation mode (pipelines, tank trucks, tube trailers, etc.) by the total miles of transportation of hydrogen provided by a particular delivery provider to determine the total volume of carbon emitted for the provider. The total volume of carbon emitted may be divided by the product of multiplying the total volume of hydrogen transported (in kilograms) for the provider and the average energy density (e.g., in Btu/kilogram) of the hydrogen transported. This may then be divided by the total miles of hydrogen provided to determine an average rate of carbon emissions (e.g., expressed as milligrams of carbon per dekatherm per mile of hydrogen transportation). The average rate may then be multiplied by the amount 818 and a total transportation distance (e.g., specified in the delivery process 822) to determine the environmental impact measure 830.

An environmental impact measure 830 for consuming the hydrogen may be calculated based on a predetermined carbon emission rate for consumed hydrogen. In one embodiment, the predetermined carbon emission rate may be 0 mg of $CO_2$/Btu. This may then be multiplied by the amount 818 to determine the environmental impact measure 830.

After generating the environmental impact measures 826, 828, 830, the computing device 802 may further generate one or more attributions 836 for the environmental impact measures 826, 828, 830. Attributions 836 may identify a party or individual to which the environmental impacts reflected within the environmental impact measures 826, 828, 830 should be attributed (e.g., for regulatory purposes, for environmental policy purposes, for cap and trade purposes, and the like). Accordingly, the attributions 836 may include a unique identifier of the party to which the corresponding environmental impact measures 826, 828, 830 should be attributed. As an example, the attribution 836 may include a unique identifier of the purchasing party 824 in order to indicate that the environmental impacts of producing, delivering, and consuming the energy resource 816 are all attributed to the purchasing party 824. Although only a single attribution 836 is depicted, in certain implementations, the computing device 802 may generate more than one attribution 836. For example, the computing device 802 may generate a first attribution associated with the first environmental impact measure 826, a second attribution associated with the second environmental impact measure 828, and/or a third attribution associated with the third environmental impact measure 830. In such examples, the first attribution may include an identifier of a producing party that produced the energy resource 816 (e.g., according to the production process 820), the second attribution may include an identifier of a delivering party that delivered the energy resource 816 (e.g., according to the delivery process 822), and/or the third attribution may include an identifier of the purchasing party 824. In still further implementations, different attributions may be calculated for different purposes based on the energy transaction 806. For example, the agreements may specify that all environmental impacts be attributed to the purchasing party 824 for regulatory purposes. Accordingly, the attribution 836 may be generated based on this specification. However, as explained further below, the computing device 802 may also be used to identify efficient and/or inefficient providers (e.g., production providers, delivery providers). Accordingly, separate attributions (e.g., the above-discussed first, second, and third attributions) may be generated and stored (e.g., in addition to the attribution 836) that separately attribute each of the first, second, and third environmental impact measures 826, 828, 830. In additional or alternative implementations, the computing device 802 may generate multiple attributions for the same environmental impact measure 826, 828, 830 for different purposes (e.g., one attribution for regulatory compliance, another attribution for compliance with contractual provisions, a third attribution for cap and trade attribution).

The attributions 836 may then be stored. For example, the attributions 836 may be stored in a distributed database 850 (e.g., via the distributed ledger layer 414). Storing the attributions 836 may include storing indications of the corresponding environmental impact measures 826, 828, 830 and/or the information extracted by the computing device 802 regarding the energy transaction 806. Storing the attributions 836 may further include adding one or more transactions or data records to a distributed ledger. For example, a single transaction may be added to a corresponding distributed ledger that contains all of the attributions 836 generated for the energy transaction 806. As another example, separate transactions may be added to the distributed ledger for each of the attributions 836 generated for the energy transaction 806.

The computing device 802 may perform further processing based on the environmental impact measures 826, 828, 830 and corresponding attributions 836. For example, the computing device 802 may be configured to generate a correction 808 for the agreement 810. The correction 808 may be generated based on the environmental impact measures 826, 828, 830 in the environmental impact constraint 814. For example, the agreement 810 may specify that a total environmental impact (e.g., total carbon or carbon equivalent emissions) for fulfillment of the energy transaction 806 (e.g., including production, delivery, and consumption) must be below a certain threshold. If that threshold is exceeded, penalties or other costs may need to be paid (e.g., to pay regulator fines, purchase carbon offsets). To determine whether an environmental impact constraint 814 has been exceeded, the computing device 802 may compare one or more of the environmental impact measures 826, 828, 830 to the environmental impact constraint 814. If the total environmental impact (e.g., total carbon or equivalent emissions) indicated by the environmental impact measures 826, 828, 830 is greater than the threshold identified by the environmental impact constraint 814, the computing device 802 may determine that the environmental impact constraint 814 has been exceeded.

Accordingly, upon determining that the environmental impact constraint 814 has been exceeded, the computing device 802 may generate a correction 808 for the agreement 810 that includes an updated environmental impact constraint 842 and/or updated cost information 844. The updated environmental impact constraint 842 may be updated to indicate that the original environmental impact constraint 814 has been exceeded. The updated environmental impact constraint 842 may further specify additional thresholds for environmental impacts (e.g., that incur additional costs). The updated cost information 844 may reflect one or more additional costs to be paid (e.g., between the parties, to a regulator). For example, the updated cost information 844 may indicate that a selling party of the energy transaction 806 purchase carbon offsets (e.g., or transfer funds to the purchasing party 824 to purchase carbon offsets) for the exceeded environmental impact constraint 814 reflected by the environmental impact measures 826, 828, 830. As another example, the updated cost information 844 may indicate that the purchasing party 824 must pay a certain specified fine to a regulator.

After generating the correction 808, the computing device 802 may automatically add the correction 808 to the agreement 810. In particular, the computing device 802 may store the correction 808 within a distributed database 850. Additionally or alternatively, the computing device 802 may update a corresponding smart contract executing on a distributed ledger based on the correction 808 (e.g., to include the updated environmental impact constraint 842 and/or the updated cost information 844). In certain implementations, the computing device 802 may cause funds to transfer automatically based on the updated cost information 844. In certain implementations, the correction 808 may be transmitted to one or both parties of the energy transaction 806 for approval. Upon approval, the computing device 802 may take one or more of the actions described above.

Environmental impact measures 826, 828, 830 and/or attributions 836 may be used to assist users in identifying efficient or inefficient production and delivery providers. For example, the computing device 802 may receive a request (e.g., from a front-end user interface 406) to determine an environmental efficiency measure 848 for one or more providers, identified by a unique provider identifier 846. For example, the user may submit a request to determine environmental efficiency measures 848 for providers that produce and/or deliver a particular energy resource 816 (e.g., natural gas). As another example, the user may submit a request to determine environmental efficiency measures 848 for particular, identified provider.

To determine the environmental efficiency measure, the computing device 802 may identify one or more attributions 838, 840 associated with a particular provider ID 846. The provider ID 846 may be identified based on the type of request received. For example, the request may identify a particular provider ID 846. As another example, the computing device 802 may identify one or more provider IDs associated with a type of energy resource 816 identified in the request received from the user. The attributions 838, 840 may be identified within a distributed database 850. For example, the computing device 802 may query a distributed ledger associated with the distributed database 850 for data records that include the provider ID 846. The attributions 838, 840 may include environmental impact measures 832, 834, which may be generated using the techniques described above. For example, the environmental impact measures 832, 834 may indicate environmental impacts of the associated provider's activities under separate energy transactions. As a specific example, where the provider ID 846 corresponds to a natural gas producer, the environmental impact measures 832, 834 may indicate environmental impacts of 2400 kilograms of $CO_2$ produced per delivered dekatherm and 1875 kilogram of $CO_2$ produced per delivered dekatherm, respectively. As another example, where the provider 846 corresponds to a natural gas delivery provider, the environmental impact measures 832, 834 may indicate impacts of 24 kilograms of $CO_2$ equivalent produced per delivered dekatherm and 18.75 kilogram of $CO_2$ produced per delivered dekatherm. The computing device 802 may receive and combine multiple attributions 838, 840 (e.g., attributions for the last predetermined number of transactions, attributions for all transactions within a preceding predetermined period of time). For example, the computing device may average or otherwise combine (e.g., as a weighted average based on transaction timing, as a weighted average by transaction amount) the identified attributions in order to generate the environmental efficiency measure 848. The environmental efficiency measure 848 may then be provided in association with the provider ID 846 and/or other identifiers of the associated provider. In certain implementations, multiple environmental efficiency measures may be generated for multiple providers (e.g., multiple producers, multiple delivery providers). In such instances, the computing device 802 may then analyze combinations of producers and delivery providers to identify efficient (e.g., the most efficient, the predetermined number of highest-efficiency) combinations of producers and delivery providers. Indications of the efficient combinations may then be provided to the front-end user interface 406 for use by the user. Accordingly, the computing device 802 is able to assist users in identifying high-efficiency producer and delivery combinations.

Although not depicted, the computing device 802 may further include a processor and a memory. The processor and memory may implement one or more aspects of the computing device 802. For example, the memory may store instructions which, when executed by the processor, may cause the processor to perform one or more operational features of the computing device 802 (e.g., to generate the environmental impact measures 826, 828, 830). The processor may be implemented as one or more central processing units (CPUs), field programmable gate arrays (FPGAs), and/or graphics processing units (GPUs) configured to execute instructions stored on the memory. Additionally, the computing device 802 may be configured to communicate (e.g., to receive the transaction data 804, to store the correction 808, to receive requests, to store the attribution 836, and the like) using a network. In particular, the computing device 802 may communicate with one or more of the front-end interface 402, the business application layer 302, the back-and services 812, and/or the distributed database 850 using the network. For example, the computing device 802 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1, and/or a global network (e.g., the Internet).

In certain implementations, the system 800 may be configured to provide one or more services for the system 400. For example, in certain implementations, the system 800 may include backend services 812, such as the middleware layer API 412 and the distributed ledger layer 414. In such instances, the computing device 802 may access and interact with these services 812 to provide the above-described functionality. In additional or alternative implementations, the computing device 802 may be part of the middleware layer API 412. For example, the environmental impact attributions may be provided as part of, e.g., the business logic/rules engine 428 and/or another component of the middleware layer API 412 (e.g., depicted or not depicted in FIG. 4A).

Figure 5:
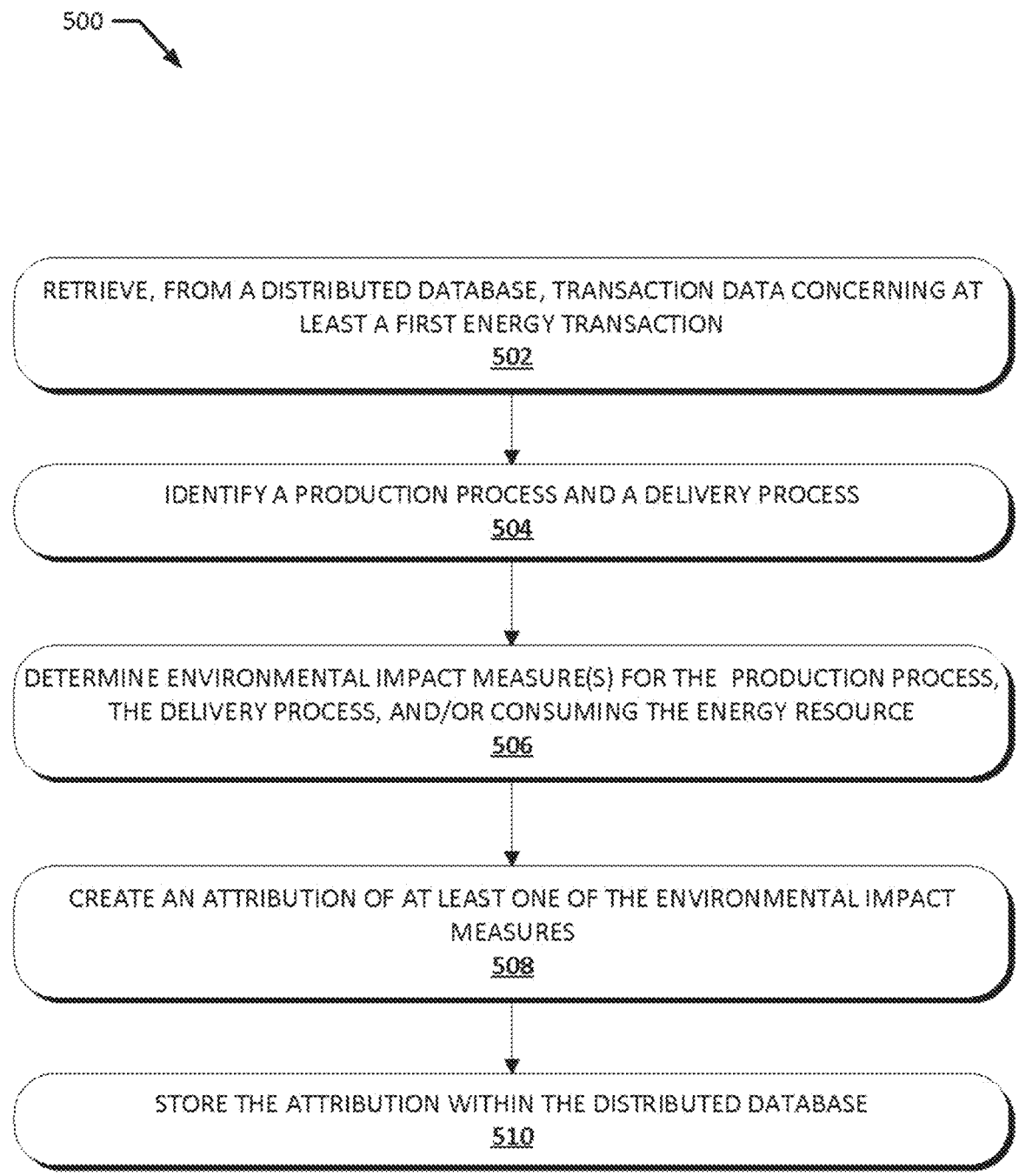
FIG. 5 illustrates a method for determining and storing environmental impact attributions for energy transactions according to exemplary embodiment of the present disclosure

FIG. 5 illustrates a method 500 for determining and storing environmental impact attributions for energy transactions according to an exemplary embodiment of the present disclosure. In certain instances, the method 500 may be performed to determine environmental impact measures for one or more activities performed according to an energy transaction (e.g., an agreement between one or more parties concerning the delivery and/or provisioning of a particular energy resource). For example, the method 500 may be performed by the computing device 802 in order to generate the environmental impact measures 826, 828, 830 and to attribute the environmental impact measures 826, 828, 830 to one or more parties according to one or more attributions 836. Generally speaking, the method 500 may be implemented on a computer system, such as the systems 300, 400, 800. For example, the method 500 may be implemented by the computing device 802. The method 500 may also be implemented by a set of instructions stored on a computer readable medium that, when executed by a processor, cause the computer system to perform the method 500. For example, all or part of the method 500 may be implemented by a processor and memory of the computing device 802 (not depicted). Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving transaction data concerning at least a first energy transaction from a distributed database (block 502). For example, the computing device 802 may receive transaction data 804 concerning an energy transaction 806 from a distributed database 850. In certain instances, the energy transaction 806 may be identified based on a request received by the computing device 802 (e.g., a request received by a user and/or a software process). For example, a request may be received from a user via a front-end user interface 402. As another example, parties to the energy transaction 806 may opt into smart contract monitoring to ensure compliance with one or more requirements (e.g., one or more environmental impact constraints 814) applicable to the energy transaction 806. In such instances, an associated software process (e.g., smart contract monitoring service) may issue the request to the computing device 802 along with an identifier of the energy transaction 806 for which monitoring is being performed. In certain instances, the computing device 802 may not receive a request. For example, the computing device 802 may implement the above-described smart contract monitoring service. Accordingly, the computing device 802 may determine that it is necessary to retrieve the transaction data 804 according to the smart contract monitoring service for further processing (e.g., described below). In certain implementations, the computing device 802 may retrieve transaction data for multiple transactions.

A production process and a delivery process may then be identified (block 804). For example, the computing device 802 may identify a production process 820 and the delivery process 822 for the energy transaction 806. In particular, the production process 820 and the delivery process 822 may be identified based on information contained within the transaction data 804. For example, the transaction data 804 may include an agreement that identifies the production process 820 and/or the delivery process 822, as described above. Additionally or alternatively, information regarding one or both of the production process 820 and the delivery process 822 may be identified in one or more additional data records stored within the distributed database 850 (e.g., within one or more transactions stored on a distributed ledger associated with the distributed database 850). In certain instances, identifying the production process 820 and/or the delivery process 822 may include performing one or more keyword searches within the transaction data 804. Additionally or alternatively, the production process 820 and/or the delivery process 822 may be specified within metadata for the energy transaction 806 (e.g., stored in association with the agreement 810 and/or one or more additional data records within the distributed database 850).

One or more environmental impact measures may be determined for the production process, the delivery process, and/or consuming the energy resource (block 506). For example, the computing device 802 may determine one or more environmental impact measures 826, 828, 830 for the production process 820, the delivery process 822, and/or consuming the energy resource 816. In particular, in certain implementations, the computing device 802 may determine one or more of a first environmental impact measure 826 for the production process 820, a second environmental impact measure 828 for the delivery process 822, and/or a third environmental impact measure 830 for consuming the energy resource 816. As described in greater detail above, determining the environmental impact measures 826, 828, 830 may differ depending on one or more of the type of energy resource 816, a particular type of production process used to create the energy resource 816, the amount 818 of the energy resource 816 delivered according to the energy transaction 806, whether one or more consumption processes are performed by a purchasing party 824 (e.g., combustion), and/or one or more types of delivery processes used to deliver the energy resource 816 (e.g., from a production site to a consumption location (e.g., associated with an end user such as the purchasing party 824). As described above, the environmental impact measures 826, 828, 830 may be generated to indicate an approximate environmental impact caused while performing the associated processes 820, 822 and/or consumption of the energy resource 816. In one specific example, the environmental impact measures 826, 828, 830 may be determined to indicate an approximate amount of carbon (or carbon equivalent) admissions caused by performing the processes 820, 822 and/or consuming the energy resource 816. In certain instances, rather than calculating separate environmental impact measures 826, 828, 830, the computing device 802 may instead be configured to calculate a single environmental impact measure (e.g., for two or more of the production process 820, the delivery process 822, and/or consuming the energy resource 816).

An attribution of at least one of the environmental impact measures may be created (block 508). For example, the computing device 802 may create one or more attributions 836 for at least one of the environmental impact measures 826, 828, 830. In certain instances, all three of the environmental impact measures 826, 828, 830 may be attributed to a single party (e.g., the purchasing party 824, a selling party identified by the agreement 810). In additional or alternative implementations, the computing device 802 may generate multiple attributions 836 (e.g., separate attributions for each of the environmental impact measures 826, 828, 830). In particular, the computing device 802 may generate a first attribution corresponding to the first environmental impact measure 826, a second attribution corresponding to the second environmental impact measure 828, and/or a third attribution corresponding to the third environmental impact measure 830, as described further above. Each of the attributions may identify a party to which corresponding environmental impacts should be attributed. For example, the first attribution may include an identifier of a producing party (e.g., which may be identified by the production process 820). As another example, the second attribution may include an identifier of the delivering party (e.g., which may be identified by the delivery process 822). As a further example, the third attribution may include an identifier of the purchasing party 824. As explained further above, environmental impact measures 826, 828, 830 may be attributed to different parties for different purposes. For example, all three of the environmental impact measures 826, 828, 830 may be attributed to the purchasing party 824 for determining compliance with an internal emissions reduction policy put forth by the purchasing party 824. As another example, when determining whether one or more production or delivery providers associated with the processes 820, 822 comply with corresponding regulatory requirements, the environmental impact measures 826, 828 may be separately attributed to each of the corresponding parties.

The attribution may then be stored within the distributed database (block 510). For example, the computing device 802 may store the attribution 836 on the distributed database 850. In certain instances, storing the attribution 836 may include storing a publicly-accessible version of the attribution 836. For example, while storing the attribution 836 on the distributed database 850, the computing device 800 may add a transaction to a corresponding distributed ledger that includes information regarding the attribution 836 (e.g., a unique identifier of the attribution, a copy of the attribution 836, and the like). In such instances, the storage attribution 836 may subsequently be used to determine one or more environmental efficiency measures 848 for one or more additional providers, as described above.

Figure 6:
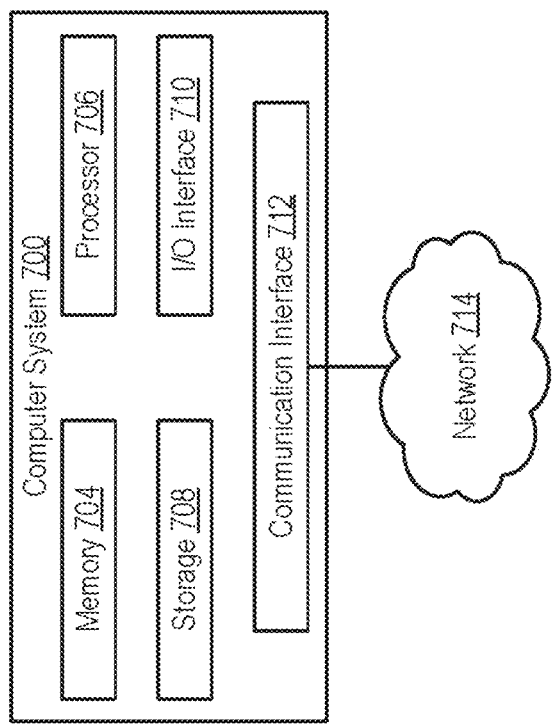
FIG. 6 illustrates a computing system, according to an exemplary embodiment of the present disclosure.

FIG. 6 illustrates an example computer system 700 that may be utilized to implement one or more of the devices and/or components discussed above, such as the business application layer 302 and components thereof, the middleware layer 308 and components thereof, the distributed ledger and machine learning layer 314 and components thereof, the client device 402 and components thereof, the proxy service 410, the middleware layer API 412 and components thereof, the distributed ledger layer 414 and components thereof, the relational database server 416, the relational data storage 418, the static file deployment, the file storage system 422, the elastic file storage 424, the back-end services 812, the distributed database 850, and/or the computing device 802. In particular embodiments, one or more computer systems 700 perform one or more operations of one or more methods described or illustrated herein, such as the method 500. In particular embodiments, one or more computer systems 700 provide the functionalities described or illustrated herein. In particular embodiments, software running on one or more computer systems 700 performs one or more operations of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a quantum computing device, an internet of things (IOT) computing device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 702. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for it. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these.

Computer system 700 may include any suitable communication interface 712 for any of these networks, where appropriate. Communication interface 712 may include one or more communication interfaces 712, where appropriate. Although this disclosure describes and illustrates a particular communication interface implementations, this disclosure contemplates any suitable communication interface implementation.

The computer system 700 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   receiving, at a first computing device and from a distributed database, transaction data concerning at least a first energy transaction concerning an energy resource, wherein the distributed database is implemented at least in part by a distributed ledger and wherein the transaction data is received from a second computing device configured to act as a node of the distributed ledger;
   identifying, by the first computing device and based on the transaction data, at least one production process associated with the first energy transaction and at least one delivery process associated with the first energy transaction;
   determining, by the first computing device, a first environmental impact measure for the at least one production process, a second environmental impact measure for the at least one delivery process, and a third environmental impact measure for consuming the energy resource;
   creating, by the first computing device, an attribution of at least one of the first environmental impact measure, the second environmental impact measure, and the third environmental impact measure to at least one party of the first energy transaction; and
   transmitting, by the first computing device, the attribution to the second computing device for storage within the distributed database.

2. The method of claim 1, wherein the attribution assigns the first environmental impact measure, the second environmental impact measure, and the third environmental impact measure to a purchasing party of the first energy transaction.

3. The method of claim 1, wherein the attribution assigns the first environmental impact measure to at least one producing party for the energy resource, assigns the second environmental impact measure to at least one delivering party for the energy resource, and assigns the third environmental impact measure to a purchasing party of the first energy transaction.

4. The method of claim 1, wherein the first environmental impact measure, the second environmental impact measure, and/or the third environmental impact measure are calculated to approximate emissions produced by the at least one production process, the at least one delivery process, and/or consumption of the energy resource.

5. The method of claim 1, further comprising generating, by a smart contract of the distributed ledger, a correction for the first energy transaction based on the attribution.

6. The method of claim 5, wherein generating the correction comprises:
   comparing, by the smart contract, a total environmental impact measure of the first energy transaction to at least one predetermined threshold associated with the first energy transaction;
   determining, by the smart contract, that the total environmental impact measure exceeds the at least one predetermined threshold; and generating, by the smart contract, an updated version of the first transaction to increase the predetermined threshold.

7. The method of claim 6, wherein the predetermined threshold is specified in an agreement for the first energy transaction, and wherein the agreement is stored on the distributed ledger.

8. The method of claim 7, wherein the correction includes an updated version of the agreement.

9. The method of claim 8, wherein the updated version of the agreement includes an adjustment to at least one financial cost of the agreement.

10. The method of claim 6, wherein the predetermined threshold is specified by at least one regulatory requirement concerning the energy resource.

11. The method of claim 6, wherein the total environmental impact includes the first environmental impact measure, the second environmental impact measure, and the third environmental impact measure.

12. The method of claim 1, wherein the at least one delivery process is identified in a second energy transaction concerning the energy resource.

13. The method of claim 1, wherein the at least one production process is identified in a third energy transaction concerning the energy resource.

14. A system comprising:
a processor; and
a memory, storing instructions which, when executed by the processor, cause the processor to:
  receive, from a distributed database, transaction data concerning at least a first energy transaction concerning an energy resource, wherein the distributed database is implemented at least in part by a distributed ledger and wherein the transaction data is received from a first computing device separate from the system and configured to act as a node of the distributed ledger;
  identify based on the transaction data, at least one production process associated with the first energy transaction and at least one delivery process associated with the first energy transaction;
  determine a first environmental impact measure for the at least one production process, a second environmental impact measure for the at least one delivery process, and a third environmental impact measure for consuming the energy resource;
  create an attribution of at least one of the first environmental impact measure, the second environmental impact measure, and the third environmental impact measure to at least one party of the first energy transaction; and
  transmit the attribution to the first computing device for storage within the distributed database.

15. The system of claim 14, wherein the attribution assigns the first environmental impact measure, the second environmental impact measure, and the third environmental impact measure to a purchasing party of the first energy transaction.

16. The system of claim 14, wherein the attribution assigns the first environmental impact measure to at least one producing party for the energy resource, assigns the second environmental impact measure to at least one delivering party for the energy resource, and assigns the third environmental impact measure to a purchasing party of the first energy transaction.

17. The system of claim 14, wherein the first environmental impact measure, the second environmental impact measure, and/or the third environmental impact measure are calculated to approximate emissions produced by the at least one production process, the at least one delivery process, and/or consumption of the energy resource.

18. The system of claim 14, the instructions further cause the processor to generate, by a smart contract of the distributed ledger, a correction for the first energy transaction based on the attribution.

19. The system of claim 18, wherein the instructions further cause the processor, while generating the correction, to:
  compare, by the smart contract, a total environmental impact measure of the first energy transaction to at least one predetermined threshold associated with the first energy transaction;
  determine, by the smart contract, that the total environmental impact measure exceeds the at least one predetermined threshold; and
  generate, by the smart contract, an updated version of the first transaction to increase the predetermined threshold.

20. The system of claim 19, wherein the predetermined threshold is specified in an agreement for the first energy transaction, and wherein the agreement is stored on the distributed ledger.

* * * * *